(12) United States Patent
Crockett

(10) Patent No.: US 12,155,746 B1
(45) Date of Patent: Nov. 26, 2024

(54) EFFICIENT COMPUTATION OF HOMOMORPHIC FUNCTIONS

(71) Applicant: Amazon Technologies, Inc., Seattle, WA (US)

(72) Inventor: Eric Crockett, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 724 days.

(21) Appl. No.: 17/160,253

(22) Filed: Jan. 27, 2021

(51) Int. Cl.
*H04L 9/00* (2022.01)
*G06F 17/16* (2006.01)
*G06N 7/01* (2023.01)

(52) U.S. Cl.
CPC .............. *H04L 9/008* (2013.01); *G06F 17/16* (2013.01); *G06N 7/01* (2023.01); *H04L 2209/34* (2013.01)

(58) Field of Classification Search
CPC ..... H04L 9/008; H04L 9/0866; H04L 9/0869; H04L 63/061; H04L 63/0442; G06F 17/16
See application file for complete search history.

(56) References Cited

U.S. PATENT DOCUMENTS

| 2014/0233726 A1* | 8/2014 | Yajima | H04L 9/008 380/28 |
| 2020/0076570 A1* | 3/2020 | Musuvathi | G06F 21/72 |
| 2022/0029783 A1* | 1/2022 | Cheon | G06F 17/16 |

OTHER PUBLICATIONS

Cheon et al., "Homomorphic Encryption for Arithmetic of Approximate Numbers," International Conference on the Theory and Application of Cryptology and Informaiton Security, Nov. 30, 2017, 23 pages.
Kim et al., "Logistic Regression Model Training Based on the Approximate Homomorphic Encryption," BMC Medical Genomics, Oct. 14, 2017, 9 pages.

* cited by examiner

*Primary Examiner* — Ellen Tran
(74) *Attorney, Agent, or Firm* — Davis Wright Tremaine LLP

(57) ABSTRACT

Techniques to improve the operation of homomorphic circuits. Systems and methods described herein may improve the operation of a homomorphic circuit by analyzing a circuit to reduce the multiplicative depth of the circuit. Techniques described herein may be utilized to perform linear algebra operations with mixed encoding units, according to a homomorphic encryption scheme.

20 Claims, 17 Drawing Sheets

EFFICIENT COMPUTATION OF HOMOMORPHIC FUNCTIONS

BACKGROUND

Homomorphic encryption is a type of encryption scheme that enables computation on encrypted data. For example, instead of evaluating a function f( ) with an input of x to compute an output y=f(x), a different function F(may accept, as an input, a ciphertext E(x) to obtain an output E(y)=F(E(x)). However, homomorphic encryption schemes may be slower than their non-homomorphic counterparts. The efficiency of evaluating a function f( ) on encrypted inputs depends on the implementation of the corresponding function F( ). The performance of the homomorphic evaluation of a function can be improved by carefully designing F( ).

BRIEF DESCRIPTION OF THE DRAWINGS

Various techniques will be described with reference to the drawings, in which.

DETAILED DESCRIPTION

Figure 1:
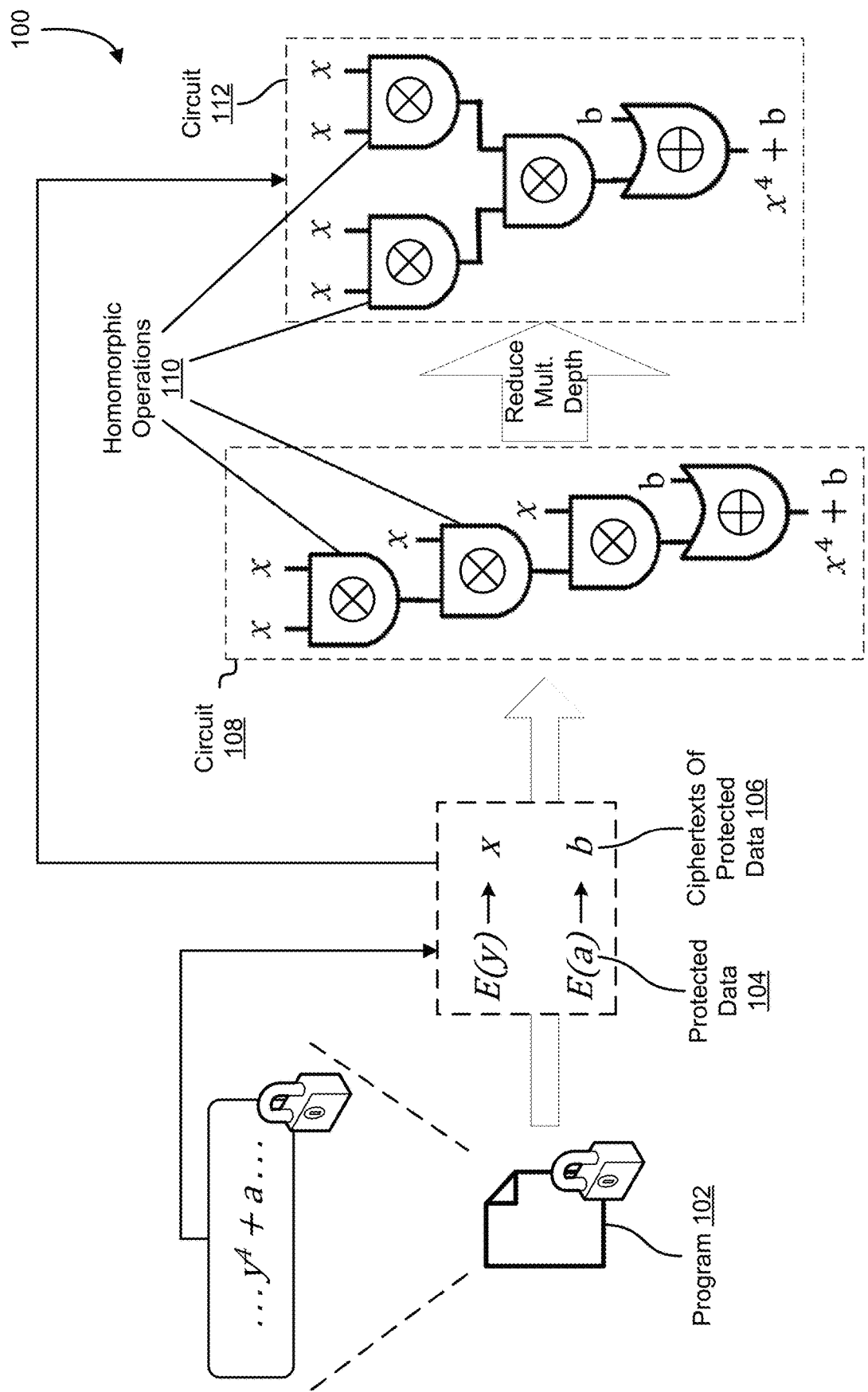
FIG. 1 shows an illustrative computing environment for generating and/or optimizing homomorphic circuits, in accordance with at least one embodiment.

Homomorphic encryption (HE) is a type of encryption scheme that allows arbitrary computations to be performed on encrypted data. For example, instead of evaluating y=ƒ(x) wherein y is an output of a function ƒ( ) with an input x, under a homomorphic encryption scheme, x is encrypted to a ciphertext X, and used as an input to function F( ) that produces an output Y that is equivalent to the ciphertext of y generated from ƒ(x). Decryption of the ciphertext is not required to evaluate F( ), and access to plaintext x is not required to compute Y. In at least some embodiments, the efficiency of the evaluation depends on the structure of function F( ), and in particular, its multiplicative depth, which refers to the maximum number of consecutive multiplications required to evaluate F( ). Homomorphic encryption can be used in a variety of settings—for example, a HE-based can be used by multiple institutions to share data in an encrypted format and run machine learning algorithms on the encrypted data without decrypting. With an HE-based approach, encrypted data for training a machine learning algorithm can be delegated to any party—even an untrusted third party—without revealing the underlying contents of the training data.

An encoding scheme can be used to map a data object to a plaintext space that can be used with an encryption scheme. For example, a matrix or vector with a set of values may be mapped to a string of bits of arbitrary length or a fixed-size list of real numbers. In various embodiments, an input $m \in C^{N/2}$ is encoded into a polynomial $m(X) \in R[X]/(X^N+1)$. Matrices and vectors can be encoded in any suitable manner—for example, as Cheon, Kim, Kim and Song (CKKS) plaintexts, which can be encrypted, and basic linear algebra operations can be performed on these encrypted objects. There may be many possible ways to encode an object. Techniques described herein formalize encoding techniques into a unified framework which can be utilized with vectors and matrices of arbitrary dimensions. Techniques described herein may be utilized to perform matrix/vector multiplication on operands with different encoding units, which meet certain requirements. As described throughout this disclosure, an operation with mixed encoding units may refer to an operation where all of the inputs and all of the outputs do not share the same encoding unit. Techniques described herein may be utilized to compute matrix products on encoded and encrypted data.

In at least some embodiments, a homomorphic circuit refers to a set of homomorphic operations that are arranged to perform a certain function. For example, a homomorphic circuit of a logistic regression training function may comprise a series of homomorphic gates that accepts a ciphertext of an input to a traditional (i.e., non-homomorphic) logistic regression training function and produces, as an output, a ciphertext output that corresponds to the output that would be generated by the logistic regression training function using the input. In some cases, a homomorphic version of a function is an approximation (e.g., $F(x) \approx f(x)$). A homomorphic circuit may be optimized using techniques described herein (e.g., those described in connection with FIGS. 1-17) to reduce the multiplicative depth of the homomorphic circuit. In at least one embodiment, the multiplicative depth of a homomorphic circuit is reduced by identifying a first portion of homomorphic operations from a first loop iteration that can be performed in parallel with a second portion of homomorphic operations from a subsequent loop iteration. Various techniques for optimizing homomorphic circuits are described in greater detail herein.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: improving the efficiency of computer systems that perform operations according to a homomorphic encryption scheme (e.g., faster computer system); improving the efficiency of computer systems that perform encrypted logistic regression model training (e.g., faster computer system); improving the security of computer systems. Furthermore, various embodiments described herein are implemented in the context of a computer system, which may be necessitated by the impracticality of performing homomorphic operations using paper and pencil or with the human mind. Practical applications (e.g., logistic regression training) may involve performing thousands or even millions of homomorphic operations without error, which would not be possible to perform, in aggregate, using the human mind. Likewise, it would not be possible to accurately perform so many homomorphic operations using pen and paper without error. Furthermore, practical applications of one or more embodiments described herein may have performance requirements, constraints, and/or goals such that using paper and pencil would be a laborious process that is too slow to integrate into the practical applications described herein.

FIG. 1 shows an illustrative computing environment 100 for generating and/or optimizing homomorphic circuits, in accordance with at least one embodiment. The computing environment 100 may be implemented using one or more servers, which may be implemented as a system in accordance with FIG. 17 described in greater detail below. In at least one embodiment, computing environment 100 is implemented as a software application or plugin running on a computer system. In at least one embodiment, a system receives or otherwise obtains a program that operates on data protected with homomorphic encryption 102. The system executing the program that operates on data protected with homomorphic encryption 102 may not have access to protected data 104. For example, the system may be a computing resource service provider that provides web service APIs that allow clients to execute machine learning or data analysis (e.g., logistic regression training) on the clients' data sets. A client may wish to keep its data confidential, while also benefiting from computing services offered by the computing resource service provider to perform machine learning or data analysis (e.g., logistic regression training). To preserve the privacy of protected data 104, ciphertexts of protected data 106 may be generated and used for execution of the program that operates on data protected with homomorphic encryption 102. For example, if a program that would typically perform a computation on two plaintext values $y^4+a$, the program that operates on data protected with homomorphic encryption 102 may instead perform the following computations: $E(y) \cdot_h E(y) \cdot_h E(y) \cdot_h E(y) +_h E(a)$ where $E( )$ refers to an encryption operation that generates a ciphertext, $\cdot_h$ refers to a homomorphic multiplication operation such that $(m_1 \cdot m_2) = E(m_1) \cdot_h E(m_2)$, and $+_h$ refers to a homomorphic addition operation such that $E(m_1+m_2) = E(m_1) +_h E(m_2)$.

A circuit 108 may represent a sequence of homomorphic operations 110 that represents the program that operates on data protected with homomorphic encryption 102 or a portion thereof.

For example, a series of homomorphic multiplication and addition gates may be used to perform computations. A set of homomorphic gates may be Turing complete such that any application can be represented using a sequence of such gates. In some cases, the same program can be represented using different circuits. For example, circuit 108 and circuit 112 are functionally identical, in the sense that they both produce the same output $x^4+b$. However, as described in greater detail below, circuit 112 may have better performance than circuit 108 because it has lower multiplicative depth. In various embodiments described herein, such as those described below in greater detail, techniques described herein may be utilized to reduce the multiplicative depth of homomorphic circuits that represent provably secure programs. Reducing the multiplicative depth of a program may result in improved computational efficiency and performance; in some cases, optimized circuits have more overall gates, but are arranged such that they are more performant that circuits with fewer gates in an inferior arrangement.

In at least some embodiments, homomorphic encryption schemes can be asymmetric or symmetric encryption schemes. For example, they may satisfy the standard definition of semantic security with reductions to hard computational problems and their set of supported homomorphic encryption operations may be a superset of traditional encryption operations. Homomorphic encryption schemes may support operations for key generation, encryption, and decryption. An illustrative example of operations for a security parameter n, in accordance with at least one embodiment, is provided below.

$$k_{ev}, k_{pk}, k_{sk} \leftarrow HE.\text{Keygen}(n)$$

$$C \leftarrow HE.\text{Encrypt}(k_{pk}, m)$$

$$m \leftarrow HE.\text{Decrypt}(k_{sk}, c)$$

$k_{pk}$ and $k_{sk}$ may refer to an asymmetric key pair comprising a public key and private key, respectively). $k_{ev}$ is an evaluation key. In at least some embodiment, $k_{ev}$ is a type of public key used to perform homomorphic computations. In at least some embodiments, the evaluation key is an abstraction of several different types of evaluation keys such as relinearization keys and Galois keys. Any suitable key generation function may be utilized, not just those that accept security parameter n as its sole parameter. As described throughout this disclosure, a ciphertext of plaintext m may be denoted as $\boxed{m}$ or c, based on context.

In at least one embodiment, a homomorphic encryption scheme described herein supports operations to encrypt a plaintext to generate a ciphertext and to decrypt a ciphertext to generate a plaintext, similar to non-homomorphic encryption schemes. In various embodiments, a homomorphic encryption scheme includes additional operations to enable computation on encrypted data, including one or more of the following operations where x, y, and z are plaintexts in $\mathbb{R}^t$, and $b \in \mathbb{R}$, and $x_i$ denotes the i-th component of plaintext x:

$\boxed{x} \oplus \boxed{y} = \boxed{z}$, where $z_i = x_i + y_i$ $\boxed{x} \oplus y = \boxed{z}$, where $z_1 = x_i + y_i$ $\boxed{x} \oplus b = \boxed{z}$, where $z_i = x_i + b$ $\boxed{x} \odot \boxed{y} = \boxed{z}$, where $z_i = x_i \cdot y_i$ $\boxed{x} \odot y = \boxed{z}$, where $z_i = x_i \cdot y_i$ $\boxed{x} \odot b = \boxed{z}$, where $z_i = x_i \cdot b$ Lrot(k, $\boxed{x}$) = $\boxed{z}$, where z is the left cyclic rotation of x by k positions ($z_i = x_{i+k \bmod t}$)

Rrot(k, $\boxed{x}$) = $\boxed{z}$, where z is the right cyclic rotation of x by k positions ($z_i = x_{i-k \bmod t}$)

The output of each operation described above may be a ciphertext variable that stores an output according to the description. Each of these operations may incur a small error, beyond the standard loss from floating point arithmetic.

In at least some embodiments, homomorphic encryption schemes described herein refer to leveled homomorphic encryption schemes. They can be parameterized to allow evaluation of any a priori fixed multiplicative depth. The multiplicative depth of a function may refer to the longest chain of consecutive multiplications in the function's circuit.

A bootstrapping process may be utilized to transform a leveled HE scheme into a fully homomorphic scheme (e.g., one which can evaluate functions of a priori unbounded multiplicative depth). This may refer to a process of homomorphically evaluating the functions decryption circuit to refresh the ciphertext. This option may lead to two evaluation strategies for any particular target function: a direct method that does not use bootstrapping, and an iterative evaluation using bootstrapping. For a function $f$ with a large depth d, it may be more efficient to use bootstrapping rather than evaluating the function directly. We explain these evaluation strategies in more detail below A direct evaluation strategy may be utilized to select parameters that support functions of depth d, and evaluate $f$ without bootstrapping. In at least some cases, it is possible to use parameters which support evaluation of functions with depth >d, but it is strictly worse from a performance perspective to do so.

Another option is to use bootstrapping. Using bootstrapping, a function $f$ is broken up into functions $f_1, \ldots, f_k$ such that $f = f_k \circ \ldots \circ f_2 \circ f_1$, where each $f_1$ has multiplicative depth d'. It may be assumed that $d = d' \cdot k$. Bootstrapping can be considered a function g of multiplicative depth b. CKKS parameters may then be chosen to support evaluation of functions of depth d'+b. After evaluating $f_i$, the ciphertext can support a depth b computation. Bootstrapping is then performed, which consumes an additional b levels, but results in a "fresh" ciphertext that can support an additional d'+b levels. Thus homomorphically, $f_k \circ g \circ \ldots \circ f_2 \circ g \circ f_1$ is evaluated. Note that bootstrapping does not necessarily need to be performed in all embodiments after $f_k$ if no more evaluation is needed.

Multiplicative depth of a function or circuit may be computed by augmenting each ciphertext (or a portion thereof) with metadata indicating a logical level. For example, a level 0 ciphertext may have a single prime in the modulus whereas a level-i ciphertext has i+1 primes in the modulus. In at least some embodiments, the multiplicative depth of a circuit is defined as the difference between the level of a freshly encrypted ciphertext and the lowest level observed in a computation of the circuit. As used in this disclosure, multiplicative depth may be used to characterize the runtime performance of various applications, functions, circuits, etc.

Techniques described here may relate to formal treatment of linear algebra encoding techniques. In at least one embodiment, these techniques can be used to implement an algorithm for homomorphic matrix-matrix multiplication and the ability to operate on objects with different encoding units. As described throughout this disclosure, a column vector may be denoted as $\vec{b}$, and a row vector may be denoted as the transpose of a column vector (i.e., $\vec{b}^T$). In at least one embodiment, objects are encoded as CKKS plaintexts, which are denoted by a tuple of doubles (e.g., (a, b, c, d)). In at least one embodiment, $t=2^k$ denotes the number of CKKS plaintext slots.

Vectors and matrices, regardless of their dimension or shape, can be encoded as one or more encoding units. In at least one embodiment, an encoding unit is an m×n matrix such that m·n=t. As noted above, $t=2^k$— accordingly, in such embodiments, the encoding unit will have two-power dimensions. As described throughout this disclosure, the encoding of an object B (e.g., vector or matrix) into a CKKS plaintext relative to an m×n encoding unit is denoted by $<B>^{[m \times n]}$. Throughout this disclosure, the encoding unit may be omitted for brevity and/or clarity and may be implied, based on context. Examples of a matrix A, column vector $\vec{x}$, and row vector $\vec{y}^T$, are given below:

$$A = \begin{bmatrix} 1 & 2 & 3 & 4 \\ 5 & 6 & 7 & 8 \end{bmatrix}$$

$$\vec{x} = \begin{bmatrix} 1 \\ -1 \\ 1 \\ -1 \end{bmatrix}$$

$$\vec{y}^T = \begin{bmatrix} 1 & 0 \end{bmatrix}$$

In at least some embodiments, a matrix encoding refers to a manner in which matrices are encoded as a list by appending the elements row-wise. For example, if a matrix with exactly as many elements as there are plaintext slots for the chosen CKKS parameters, the encoding unit may be chosen to coincide with the matrix dimensions, and the matrix may be encoded in row-major order. For example, if t=8 for $$A = \begin{bmatrix} 1 & 2 & 3 & 4 \\ 5 & 6 & 7 & 8 \end{bmatrix}$$

and according to at least one embodiment:

$<A>^{[2 \times 4]} = (1,2,3,4,5,6,7,8)$

Vector encoding may refer to a manner in which vectors are encoded as a list. Although vectors and lists are both a linear sequence of values that is amenable to a straightforward mapping (e.g., vector $\vec{b} = (5, 6)$ encoded as the list [5, 6]), various embodiments described herein may utilize a different encoding that allows for more efficient matrix operations. For example, various programs may compute a matrix/vector product. A training algorithm may choose its matrices so that each matrix can be encoded as a single ciphertext. In particular, this may mean that there are enough plaintext slots to hold each element of the matrix. For example, a column vector $\vec{b} \in \mathbb{R}^n$ can be encoded with respect to a single m×n encoding unit by creating a m×n matrix where each row of the vector is $\vec{b}^T$ and encoding the matrix as described above. For example, the encoding for column vector $\vec{x}$ as described above, and according to at least one embodiment, may be:

$$\langle \vec{x} \rangle^{[2\times 4]} = \left\langle \begin{bmatrix} 1 & -1 & 1 & -1 \\ 1 & -1 & 1 & -1 \end{bmatrix} \right\rangle^{[2\times 4]} = (1, -1, 1, -1, 1, -1, 1, -1)$$

Similarly, for a row vector $\vec{b}^T \in \mathbb{R}^m$, it can be encoded with respect to a single m×n encoding unit where each column is $\vec{b}$. For example, the encoding for row vector $\vec{y}^T$ as described above, and according to at least one embodiment, may be:

$$\langle \vec{y}^T \rangle^{[2\times 4]} = \left\langle \begin{bmatrix} 1 & 1 & 1 & 1 \\ 0 & 0 & 0 & 0 \end{bmatrix} \right\rangle^{[2\times 4]} = (1, 1, 1, 1, 0, 0, 0, 0)$$

As described above, ⊕ and ⊙ operate component-wise (e.g., element-wise or entrywise) on the encoded plaintext, and can be combined with the encodings above, which leads to a homomorphic implementation for various linear algebra operations. In at least one embodiment, let A, B ∈ $\mathbb{R}^{m\times n}$, c ∈ R, $\vec{x}$, $\vec{y}$ ∈ R, $\vec{w}^T$, $\vec{z}^T \in \mathbb{R}^m$, and define 1. as the matrix/vector of all 1s whose shape is the same as •. The following equations show how homomorphic operations can, in various embodiments, induce simple linear algebra operations on encoded objects—in the examples given below, the objects are encoded with respect to the m×n encoding unit. Note that the constant c does not need to be encoded in embodiments such as those where its value is assumed to be public. In various embodiments, matrices and vectors are always encoded, even if not encrypted.

$$\langle A \rangle \oplus \langle B \rangle = \langle A + B \rangle$$

$$\langle A \rangle \oplus c = \langle A + c \cdot 1_A \rangle$$

$$\langle A \rangle \odot \langle B \rangle = \langle A \circ B \rangle$$

$$c \odot \langle A \rangle = \langle c \cdot A \rangle$$

$$\langle \vec{x} \rangle \oplus \langle \vec{y} \rangle = \langle \vec{x} + \vec{y} \rangle$$

$$\langle \vec{x} \rangle \oplus c = \langle \vec{x} + c \cdot 1_{\vec{x}} \rangle$$

$$\langle \vec{x} \rangle \odot \langle \vec{y} \rangle = \langle \vec{x} \circ \vec{y} \rangle$$

$$c \odot \langle \vec{x} \rangle = \langle c \cdot \vec{x} \rangle$$

$$\langle \vec{w}^T \rangle \oplus \langle \vec{z}^T \rangle = \langle \vec{w}^T + \vec{z}^T \rangle$$

$$\langle \vec{w}^T \rangle \oplus c = \langle \vec{w}^T + c \cdot 1_{\vec{w}^T} \rangle$$

$$\langle \vec{w}^T \rangle \odot \langle \vec{z}^T \rangle = \langle \vec{w}^T \circ \vec{z}^T \rangle$$

$$c \odot \langle \vec{w}^T \rangle = \langle c \cdot \vec{w}^T \rangle$$

Matrix/vector multiplication may be implemented using techniques described in detail below.

Homomorphic multiplication of a ciphertext encrypting matrix A and a ciphertext encrypting matrix B corresponds to the Hadamard product (component-wise product, denoted) of the two matrices and performs all of the multiplications of a matrix/matrix product in a single homomorphic operation. Likewise, homomorphic multiplication of a ciphertext encrypting matrix and a ciphertext encrypting a row or column vector computes all of the multiplications for a matrix/vector product in a single homomorphic operation, which can be computed by summing the columns or rows of the result matrix. Accordingly, encoding column vectors as rows in a matrix can be utilized to improve the computational efficiency of various techniques described herein. In at least some embodiments, after encoding a vector as a matrix, the matrix is encoded to produce a list of coefficients, and the CKKS scheme further encodes the list to produce a ring element.

Techniques for summing matrix rows described herein are implemented in accordance with at least one embodiment. In at least some embodiments, it is assumed or known that a plaintext matrix is full-dimensional (e.g., it has h rows and w columns and that the homomorphic encryption parameters yield a plaintext space with exactly h·w slots). In at least one embodiment, h is set to a power of two. In at least some embodiments, a low-depth circuit computes the sum of the rows of the matrix. In at least some embodiments, the result is a matrix the same size as the input where each row is identical and is the sum of the rows of the input matrix such that:

$$SumRows\left(\left\langle \begin{bmatrix} a & b \\ c & d \end{bmatrix} \right\rangle\right) = \left\langle \begin{bmatrix} a+c & b+d \\ a+c & b+d \end{bmatrix} \right\rangle = \left\langle \begin{bmatrix} a+c \\ b+d \end{bmatrix} \right\rangle$$

Note that this corresponds to the encoding of the answer as a column vector, which is backwards from what one might expect: the sum of rows should be a row vector (and therefore the result should be encoded as columns in a matrix according to the explanation above). This observation is formalized as the following:

Let: $\vec{x}^T \in R^m$ be a row $A \in R^{m\times n}$ be a matrix.

Then: $SumRows(\vec{x}^T) \odot \langle A \rangle = \langle (\vec{x}^T \cdot A)^T \rangle = \langle A^T \cdot \vec{x} \rangle$ where all encodings are relative to a m×n encoding unit. In at least one embodiment, this functionality is implemented using (e.g., implied as or based at least in part on) the following algorithm:

Algorithm 1 (SumRows): summation of matrix rows
Input: $\langle A \rangle^{[m\times n]}$ and the encoding unit m×n for $A \in R^{m\times n}$ and m, n powers of two
Output: An n-dimensional vector encoded as the rows of a m×n matrix (i.e., a m×n encoding unit)
1: R=⟨A⟩
2: for 0≤i<log₂ m do
3: R=Lrot$_{n\cdot 2^i}$(R)⊕R
4: end for
5: return R SumRows, as defined above, is also an additive homomorphism. Let $\vec{x}^T$, $\vec{y}^T \in R^m$, and A, B ∈ $R^{m\times n}$, then:

SumRows(⟨$\vec{x}^T$⟩⊙⟨A⟩)+SumRows
(⟨$\vec{y}^T$⟩⊙⟨B⟩)=SumRows(⟨$\vec{x}^T$⟩⊙⟨A⟩⊕
⟨$\vec{y}^T$⟩⊙⟨B⟩)

where all encodings are relative to the same m×n encoding unit.

Multiplying a matrix by a column vector is similar: an encoded matrix is multiplied with an encoded column vector component-wise, then the columns of the product are summed. Algorithm 2 below defines the SumCols algorithm for summing the columns of a matrix and outputting the result as an encoded row vector. As noted previously, the explicit encoding unit may be omitted as an argument when it is clear from the context, and treat this circuit as a homomorphic instruction by the same name.

Algorithm 2 (SumCols): summation of matrix columns
Input: $\langle A \rangle^{[m \times n]}$ and the encoding unit m×n for $A \in R_{m \times n}$ and m, n, powers of two
Output: An m-dimensional vector encoded as the columns of a m×n matrix (i.e., a m×n encoding unit)
1: R=$\langle A \rangle$
2: for $0 \leq i < \log_2 n$ do
3: R=Lrot$_{2^i}$(R) $\oplus$ R
4: end for
5: $D \in R_{m \times n} = \{D_{i,j}\}$, where $D_{i,j}=1$ if $j=0$ and $0$ otherwise.
6: R=R$\odot\langle D \rangle^{[m \times n]}$
7: for $0 \leq i < \log_2 n$ do
8: R=Rrot$_{2^i}$(R) $\oplus$ R
9: end for
10: return R SumCols is also an additive homomorphism. Formally, let $\vec{x}, \vec{y} \in R^n$, and $A, B \in R^{m \times n}$, then:

SumCols($\langle A \rangle \odot \langle \vec{x} \rangle$)+SumCols
($\langle B \rangle \odot \langle \vec{y} \rangle$)=SumCols($\langle A \rangle \odot$
$\langle \vec{x} \rangle \oplus \langle B \rangle \odot \langle \vec{y} \rangle$)

where all encodings are relative to the same m×n encoding unit.

While various embodiment described above operate on m×n matrices where m·n=t, m-dimensional row vectors, and n-dimensional column vectors, techniques described herein are not limited to vectors and matrices of such dimensions and, in fact, these operations can be extended to support vectors and matrices of arbitrary dimensions.

Techniques described herein may be utilized to encode small matrices, relate to the desired encoding unit. For a $f \times g$ matrix A where $f \cdot g \leq t$ and arbitrary $f$, $g$ (e.g., not necessarily a power of two), and m, n such that $f \leq m$, $g \leq n$, matrix A can be embedded with respect to a m×n encoding until by extending each row of the matrix with $n-g$ zeros and adding $m-f$ rows of zeros below:

$$\begin{bmatrix} A & 0 \\ 0 & 0 \end{bmatrix} \begin{matrix} \}f \\ \}m-f \end{matrix}$$
$$\begin{matrix} g & n-g \end{matrix}$$

To encode the matrix A, it is first embedded into an m×n matrix as shown above, and then that matrix is encoded using the same techniques described above (e.g., row-major encoding):

$$\langle A \rangle = \left\langle \begin{bmatrix} A & 0 \\ 0 & 0 \end{bmatrix} \right\rangle$$

Note that when $f=m$ and $g=n$, this encoding coincides with the basic matrix encoding described above and that the algorithms and equations described above still hold with this encoding. Likewise, a corresponding generalized encoding for encoding row vectors of dimension $f \leq m$ or column vectors of dimension $g \leq n$ may be employed: first pad the vector with zeros to length m or n, respectively, and then use the normal vector encoding as described above.

Pairing these encoding for matrices and vectors, shows that matrix-vector multiplication works as expected: for $A \in \mathbb{R}^{f \times g}$, $\vec{b} \in \mathbb{R}^g$, and, $\vec{c}^T \in \mathbb{R}_f$:

SumCols($\langle A \rangle \odot \langle \vec{b} \rangle$)=$\langle \vec{b}^T \cdot A^T \rangle$ SumRows($\vec{c}^T \odot \langle A \rangle$)=$\langle A^T \cdot \vec{c} \rangle$ where all encodings are with respect to an m×n encoding unit.

Techniques described herein may be utilized for encoding large matrices—given an $f \times g$ matrix A for arbitrary $f$, $g$ (e.g., not necessarily powers of two), an arbitrary m×n encoding unit may be chosen for $f \geq m$, $g \geq n$. Matrix A can be embedded into several plaintexts by dividing it into m×n submatrices and encoding each piece independently. Thus:

$$\langle A \rangle = \{\langle A \rangle_{i,j}\}_{\substack{0 \leq i < \lceil f/m \rceil \\ 0 \leq j < \lceil g/n \rceil}}$$

This can be equivalent to padding matrix A with 0s to have a multiple of m rows and a multiple of n columns, and then dividing it into m×n submatrices. Accordingly, the following equations apply to this encoding:

$\langle A \rangle \oplus \langle B \rangle = \{C_{i,j}\}$, where $C_{i,j} = \langle A \rangle_{i,j} \oplus \langle B \rangle_{i,j}$ $\langle A \rangle \oplus c = \{C_{i,j}\}$, where $C_{i,j} = \langle A \rangle_{i,j} \oplus c$ $\langle A \rangle \odot \langle B \rangle = \{C_{i,j}\}$, where $C_{i,j} = \langle A \rangle_{i,j} \odot \langle B \rangle_{i,j}$ $\langle A \rangle \odot c = \{C_{i,j}\}$, where $C_{i,j} = c \odot \langle A \rangle_{i,j}$ The same technique can be extended to a row (or column) vector of arbitrary dimension f (or g) by zero-extending the vector to a multiple of m (or n) and then dividing the vector up into $\lceil f/m \rceil$ (or $\lceil g/n \rceil$) chunks $\{\vec{b}_i\}$ of size m (or n). Each $\vec{b}_i$ is then encoded with an m×n encoding unit, as described above. Matrix/vector multiplication can also be extended to work for larger objects. For $A \in R^{f \times g}$, $\vec{b} \in R_f$, $$\langle \vec{b}^T \cdot A^T \rangle = \{C_i\}, \text{ where } C_i = \text{SumCols}\left(\sum_j \langle A \rangle_{i,j} \odot \langle \vec{b} \rangle_j\right)$$

and similarly, for $A \in R^{f \times g}$, $\vec{b} \in R^f$, $$\langle A^T \cdot \vec{b} \rangle = \{C_j\}, \text{ where } C_j = \text{SumRows}\left(\sum_i \langle \vec{b}^T \rangle_i \odot \langle A \rangle_{i,j}\right)$$

The SumRows and SumCols maps can be extended to work on matrices which do not have the same dimensions and would therefore not be able to be added together. For example, consider $A \in R^{f \times g_1}$ and $B \in R^{f \times g_2}$ where $g_1 \neq g_2$: the sums $A+B$ and $\langle A \rangle \oplus \langle B \rangle$ are not well-defined. Nevertheless, a linear map can be defined by first summing the horizontal encoding units of $\langle A \rangle$ and $\langle B \rangle$ into a single column of units, then applying SumCols. The same approach can be used to extend the map onto matrices with the same width and different heights using SumRows.

A completely generic algorithm for computing standard matrix products on encoded objects is described herein. Such an algorithm works on encoded matrices as well as on encrypted matrices. Given $A \in \mathbb{R}^{f \times g}$, $B \in \mathbb{R}^{g \times h}$, and $c \in \mathbb{R}$, the product c·AB can be computed two ways, either viewing the matrix product as the rows of A times the matrix B, or as the matrix A times the columns B. The mathematical algorithm for matrix/matrix multiplication does not distinguish between these views, but due to the encodings used for homomorphic encryption, these two algorithms accept different inputs.

For example, Algorithm 3 below accepts encodings of $A^T$ and B as inputs, and multiplies the rows of A times B. The $f$ loop iterations (steps 2-10) can be performed in parallel Algorithm 3 (MatProd_RowMajor): product of matrices, viewing first matrix as a set of rows
Input: $<A^T>^{[m \times n]}$, $<B>^{[m \times n]}$, for $A \in \mathbb{R}^{f \times g}$, $B \in \mathbb{R}^{g \times h}$, and $c \in \mathbb{R}$
Output: $<c \cdot A \cdot B>^{[m \times n]}$
1: for $0 \le k < f$ do
2: $D \in \mathbb{R}^{m \times n} = \{d_{i,j}\}$, where $d_{i,j}=1$ if $j \equiv k \bmod n$ and 0 otherwise
3: $A_k = \{A_{k,i}\}_{0 \le i < \lceil g/m \rceil}$, where $A_{k,i} = <D>^{[m \times n]} \odot <A^T>_{i \lfloor k/n \rfloor}$
4: $A_k = Lrot_{k \bmod n}(A_k)$
5: for $0 \le j < \log_2(n)$ do
6: $A_k = Rrot_{2^j}(A_k) \oplus A_k$
7: end for
8: $R_k = SumRows(A_k \odot <B>)$
9: $E \in \mathbb{R}^{m \times n} = \{e_{i,j}\}$, where $e_{i,j}=c$ if $i \equiv k \bmod m$ and 0 otherwise
10: $S_k = \{S_{k,j}\}_{0 \le j < \lceil h/n \rceil}$, where $S_{k,j} = R_{k,j} \odot <E>^{[m \times n]}$
11: end for
12: return $T = \{T_i\}_{0 \le i < \lceil f/m \rceil}$, where $T_i = \sum_{k=i \cdot m}^{\min(f-1, i \cdot m + m - 1)} S_k$ Line 3 involves $\lceil g/m \rceil$ parallel multiplications; line 4 involves $\lceil g/m \rceil$ parallel rotations; line 5 involves $\log_2(n)$ sequential rotations; line 8 involves $\lceil g/m \rceil \cdot \lceil h/n \rceil$ parallel multiplications and $\log_2(m)$ sequential rotations; line 10 involves $\lceil h/n \rceil$ parallel multiplications. Thus, overall, given one or more processors with approximately $$\frac{f \cdot g \cdot h}{m \cdot n}$$

cores, MatProd_RowMajor can be computed for the cost of three multiplications and $1+\log_2(m)+\log_2(n)$ rotations.

As noted above, an alternative way of viewing matrix/matrix multiplication is as a series of matrix/column-vector products, as shown below in Algorithm 4. This algorithm has identical performance characteristics to Algorithm 3 above, but accepts transposed inputs.

Algorithm 4 (MatProd_ColMajor): product of matrices, viewing second matrix as a set of columns
Input: $<A>^{[m \times n]}$, $<B^T>^{[m \times n]}$, for $A \in R^{f \times g}$, $B \in R^{g \times h}$, and $c \in R$
Output: $<c \cdot A \cdot B<^{[m \times n]}$
1: for $0 \le k < h$ do
2: $D \in R^{m \times n} = \{d_{i,j}\}$, where $d_{i,j}=1$ if $i \equiv k \bmod m$ and 0 otherwise
3: $B_{k,j} = \{B_{k,j}\}_{0 \le j < \lceil g/n \rceil}$, where $B_{k,j} = <D>^{[m \times n]} \odot <B^T>_{\lfloor k/m \rfloor, j}$
4: $B_k = SumRows(B_k)$
5: $R_k = <A> \odot B_k$
6: for $0 \le j < \log_2(n)$ do
7: $R_k = Lrot_{2^j}(R_k) \oplus R_k$
8: end for
9: $E \in R^{m \times n} = \{e_{i,j}\}$, where $e_{i,j}=c$ if $i \equiv 0 \bmod n$ and 0 otherwise
10: $S_k = \{S_{k,j}\}_{0 \le j < \lceil h/n \rceil}$, where $S_{k,j} = Rrot_{k \bmod n}(R_{k,j} \odot <E>^{[m \times n]})$
11: end for
12: return $T = \{T_i\}_{0 < i < \lceil h/n \rceil}$, where $$T_i = \sum_{k=i \cdot n}^{\min(h-1, i \cdot n + n - 1)} S_k$$

Techniques described herein may be utilized to perform linear algebra operations on objects with different encoding units. An operation for transposing encoding units can be used to facilitate linear algebra operations such as matrix-vector and matrix-matrix multiplication with mixed encoding units. As described in greater detail below, a logical transpose operation may be used to take a linear algebra encoded with an m×n unit and produce a new object (e.g., ciphertext) encoded with an n×m unit. A logical transpose operation may simply require a mental shift in how an object is encoded and can be performed without any additional computation or manipulation of the encoded object. To perform a logical transpose, an encoded input can be first interpreted as a flat CKKS ciphertext and then be reinterpreted as an encoded object with the transpose of the input encoding unit. For example, let $A \in R^{m \times m}$ and $t=m \cdot n$ where $f$, $g \le m \le n$. Then $<A>^{[m \times n]} = [A|0]$ and $$LogTrans(\langle A \rangle^{[m \times n]}) = \begin{bmatrix} -\vec{a}_0^T - \\ 0 \\ -\vec{a}_1^T - \\ 0 \\ \vdots \\ -\vec{a}_{m-1}^T - \\ 0 \end{bmatrix}$$

where $\vec{a}_i^T$ is the i-th row of A and each 0 is $$\left(\frac{n}{m} - 1\right) \times m.$$

This is not a valid encoding of any relevant linear algebra object, but it satisfies the following useful identify: let $A \in R^{f \times g}$ and $t=m \cdot n$ where $f$, $g \le m \le n$. Then Log Trans(Log Trans($<A>^{[m \times n]}$))=$<A>^{[m \times n]}$.

Algorithm 3 can be modified to support mixed encoding units where input matrices A and B that are encoded relative to an n×m encoding unit and the output matrix is encoded relative to an m×n encoding unit. However, this added functionality may come with an additional restriction where $A \in R^{f \times g}$ and $B \in R^{g \times h}$ are both encoded with an m×n encoding unit where $f$, $g \le m \le n$. At a high level, the goal is to arrange the sum on Line 12 of Algorithm 3 to be Log Trans($<c \cdot AB>^{[m \times n]}$). In that case, applying another Log Trans produces $<c \cdot AB>^{[m \times n]}$. Given $<A^T>^{[n \times m]}$, $<B>^{[n \times m]}$ as inputs that meet the dimensional restrictions described above, the mask on line 9 of Algorithm 3 described above can be modified so that the algorithm outputs $<c \cdot AB>^{[m \times n]}$ even though the input operands are encoded relative to a first encoding unit (n×m) and the output is encoded relative to a different encoding unit (m×n). Specifically, rather than masking out m consecutive rows, line 9 can instead be modified to distribute those rows evenly across the n rows of the encoding unit in the following manner, and in accordance with at least one embodiment:

$E \in R^{m \times n} = \{e_{i,j}\}$, where $e_{i,j}=c$ if $i=k, j<m$ and 0 otherwise By making this modification, rather than obtaining a result encoded as $$\begin{bmatrix} c \cdot AB \\ 0 \end{bmatrix}$$

with respect to an n×m encoding unit in Algorithm 3 as depicted above, this modified algorithm instead produces:

$$\begin{bmatrix} -c \cdot \vec{a}_0^T B - \\ 0 \\ -c \cdot \vec{a}_1^T B - \\ 0 \\ \vdots \\ -c \cdot \vec{a}_{m-1}^T B - \\ 0 \end{bmatrix}$$

where $\vec{a}_i^T$ is the i-th row of matrix A. There may be additional zero padding to the left, if h<m. This result is precisely Log Trans($<c \cdot AB>^{[m \times n]}$), as desired. This modified algorithm may be referred to as MatProd$^T$, and the functionality can be described in the following manner: let $A \in R^{f \times g}$, $B \in R^{g \times h}$, and $c \in R$ where m·n=t and $f$, h≤m≤n, then:

MatProd$^T$($<A^T>^{[n \times m]}, <B>^{[n \times m]}, c) = <c \cdot AB>^{[m \times n]}$ Techniques described herein may be utilized for multiplication of a matrix and column vector. There are various ways to encode $\vec{v} \in R^m$ to multiply it by a matrix $A \in R^{f \times g}$ encoded relative to an m×n encoding unit with m≤n. For example, $\vec{v}$ can be directly encoded as rows using an n×m encoding unit, or the rows can be zero-extended and encoded with an m×n unit. Different encoding units may be preferred based on use case. For example, if the vector only needs to be multiplied by m×m matrices encoded relative to an m×n unit, then the latter encoding is fine: the homomorphic product results in an m×n matrix with some zero-columns on the right does not affect SumCols. However, assume that the vector is also used to compute $B \cdot \vec{v}$ for $B \in R^{n \times m}$ in addition to $A \cdot \vec{v}$. Then, it may be preferable to encode the vector relative to an n×m unit. Accordingly, in such cases, the problem is to compute $<\vec{v}^T \cdot A^T>^{[m \times n]}$ given $<A>^{[m \times n]}$ and $<\vec{v}>^{[n \times m]}$. As with matrix-matrix multiplication, a solution involves a mental shift in how objects are encoded, rather than additional computation. First, it is noted that $<A>^{[m \times n]}$ looks like [A|0] as it was previously given $A \in R^{m \times m}$ with m<n. Furthermore, $<\vec{v}>^{[n \times m]}$ is encoded as rows of an n×m matrix. If $<\vec{v}>^{[n \times m]}$ is viewed as an m×n matrix, it looks like:

$$LogTrans(\langle\vec{v}\rangle^{[n \times m]}) = \begin{bmatrix} -\vec{v}^T - & -\vec{v}^T - & \ldots & -\vec{v}^T - \\ -\vec{v}^T - & -\vec{v}^T - & \ldots & -\vec{v}^T - \\ \vdots & \vdots & \vdots & \vdots \\ -\vec{v}^T - & -\vec{v}^T - & \ldots & -\vec{v}^T - \end{bmatrix}$$

Thus, the homomorphic product corresponds to:

$$\langle A \rangle^{[m \times n]} \odot LogTrans(\langle\vec{v}\rangle^{[n \times m]}) = \begin{bmatrix} -\vec{a}_0^T \circ \vec{v}^T - & 0 & \ldots & 0 \\ -\vec{a}_1^T \circ \vec{v}^T - & 0 & \ldots & 0 \\ \vdots & \vdots & \vdots & \vdots \\ -\vec{a}_{m-1}^T \circ \vec{v}^T - & 0 & \ldots & 0 \end{bmatrix}$$

where $\vec{a}_i^T$ is the i-th row of matrix A. Thus, SumCols relative to an m×n encoding unit can be used to compute $<\vec{v}^T \cdot A^T>^{[m \times n]}$ and this process can be captured in the following manner: let $A \in R^{f \times g}$, $\vec{x} \in R^g$, and t=m·n where g≤m≤n. Then:

SumCols($<A>^{[m \times n]}$⊙Log Trans($<\vec{x}>^{[n \times m]}$))=SumCols($<A>^{[m \times n]}$⊙$<\vec{x}>^{[m \times n]}$)=$<\vec{x}^T \cdot A^T>^{[m \times n]}$ With regard to multiplying matrix $A \in R^{f \times g}$ by a row vector $\vec{v}^T \in R^f$, a similar situation arises: to compute row-vector/matrix products where the inputs have the same encoding unit and the output has a different encoding unit. If $A \in R^{f \times g}$, $\vec{x}^T \in R^m$, t=m·n where $f$, g≤m≤n, and let $<\vec{c}>^{[m \times n]}$=SumRows($<A>^{[m \times n]}$), then SumRows(Log Trans($<A>^{[m \times n]}$))=$<\vec{c}>^{[n \times m]}$ which can be understood to be true based on the disclosures above relating to the logical transform operation. As a corollary, let $A \in R^{f \times g}$, $\vec{x}^T \in R^m$, and t=m·n where $f$, g≤m≤n, then:

SumRows(Log Trans($<\vec{x}^T>^{[m \times n]}$⊙$<A>^{[m \times n]}$))=SumRows($<\vec{x}^T>^{[n \times m]}$⊙$<A>^{[n \times m]}$)=$<A^T \cdot \vec{x}>^{[n \times m]}$ Techniques described herein to train a logistic regression model may be implemented in accordance with at least one embodiment. If there are $f$ training data points, each with g−1 features, this may be represented as a matrix $X_i \in R^{f \times g}$, where the first column of the matrix consists of the labels for each data point (e.g. either 0 or 1), and other columns correspond to respective features. The machine learning concept of mini-batches may refer to a strategy to divide this data up into m×g pieces where m<$f$. It is not guaranteed that m divides $f$, for example, the last mini-batch may have fewer than $f$ data points. Mini-batches with fewer than $f$ data points may be padded with rows of zeros at the bottom of the data.

In various embodiments, a logistic regression algorithm utilizes a sigmoid function $$\sigma(x) = \frac{1}{1+e^{-x}}.$$

For simple binary classification (e.g., where the training data is in exactly one of two categories labeled "0" and "1"), Pr(Y=1|X=$\vec{x}$)=σ($\vec{y}$,(1,$\vec{x}$)) where (1, $\vec{\cdot}$) denotes pre-pending the vector with a 1.

In some embodiments, it is difficult to compute the sigmoid function homomorphically due to the exponentiation operation. In some embodiments, the sigmoid function is approximated as a polynomial function. An example of such an approximation function may be in the form of $c_3 \cdot x^3 + c_1 \cdot x + c_0$. In at least some embodiment, a polynomial approximation of the sigmoid function in the range of [−8, 8] is represented as $\sigma(x)=0.5+0.5x-0.15x^3$. Let $\vec{\sigma}'(\vec{\cdot})$ denote the application of the sigmoid approximation to each component of the input vector, in at least some embodiments. It should be noted that this is merely one among several possible approximate representations of a sigmoid function that can be utilized in connection with embodiments described herein to replace a true sigmoid function.

Accordingly, an algorithm for training a logistic regression model may be implemented as or based at least in part on:

---

Algorithm 5: Mini-batch training algorithm

---

Input: Tweaked mini-batches $Z_i \in \mathbb{R}^{f \times g}$ for $0 \le i < k$, learning rate $\alpha$
Output: $\vec{v}_k \in \mathbb{R}^g$ 1:    $\epsilon_0 = 1$
2:    $\vec{w}_0 = \vec{v}_0 = \vec{0} \in \mathbb{R}^g$
3:    $\gamma = \alpha/f$
4:    for $0 \le i < k$ do
5:    $\epsilon_{i+1} = \dfrac{1 + \sqrt{4\epsilon_i^2 + 1}}{2}$
6:    $\eta_i = \dfrac{1 - \epsilon_i}{\epsilon_{i+1}}$
7:    $\vec{\ell}_i = Z_i \cdot \vec{v}_i$
8:    $\vec{b}_i = \vec{\sigma}'(-\vec{\ell}_i)$
9:    $\vec{\lambda}_i = Z_i^T \cdot \vec{b}_i$
10:    $\vec{w}_{i+1} = \vec{v}_i + \gamma \cdot \vec{\lambda}_i$
11:    $\vec{v}_{i+1} = (1 - \eta_i)\vec{w}_{i+1} + \eta_i \vec{w}_i$
12:    end for
13:    return $\vec{v}_k$

---

In various embodiments described herein, optimization techniques are applicable to iterations of this algorithm including steps 7-11 and/or other surrounding steps. In at least one embodiment, algorithm 6 described below corresponds to a single mini-batch training iteration and the performance of this training iteration—which may be performed many times—is improved. Algorithm 6 uses the sigmoid approximation $\vec{\sigma}'$ rather than the true sigmoid, which is more efficient for homomorphic evaluation, in at least one embodiment.

Algorithm 6: Mini-batch training iteration

Figure 2:
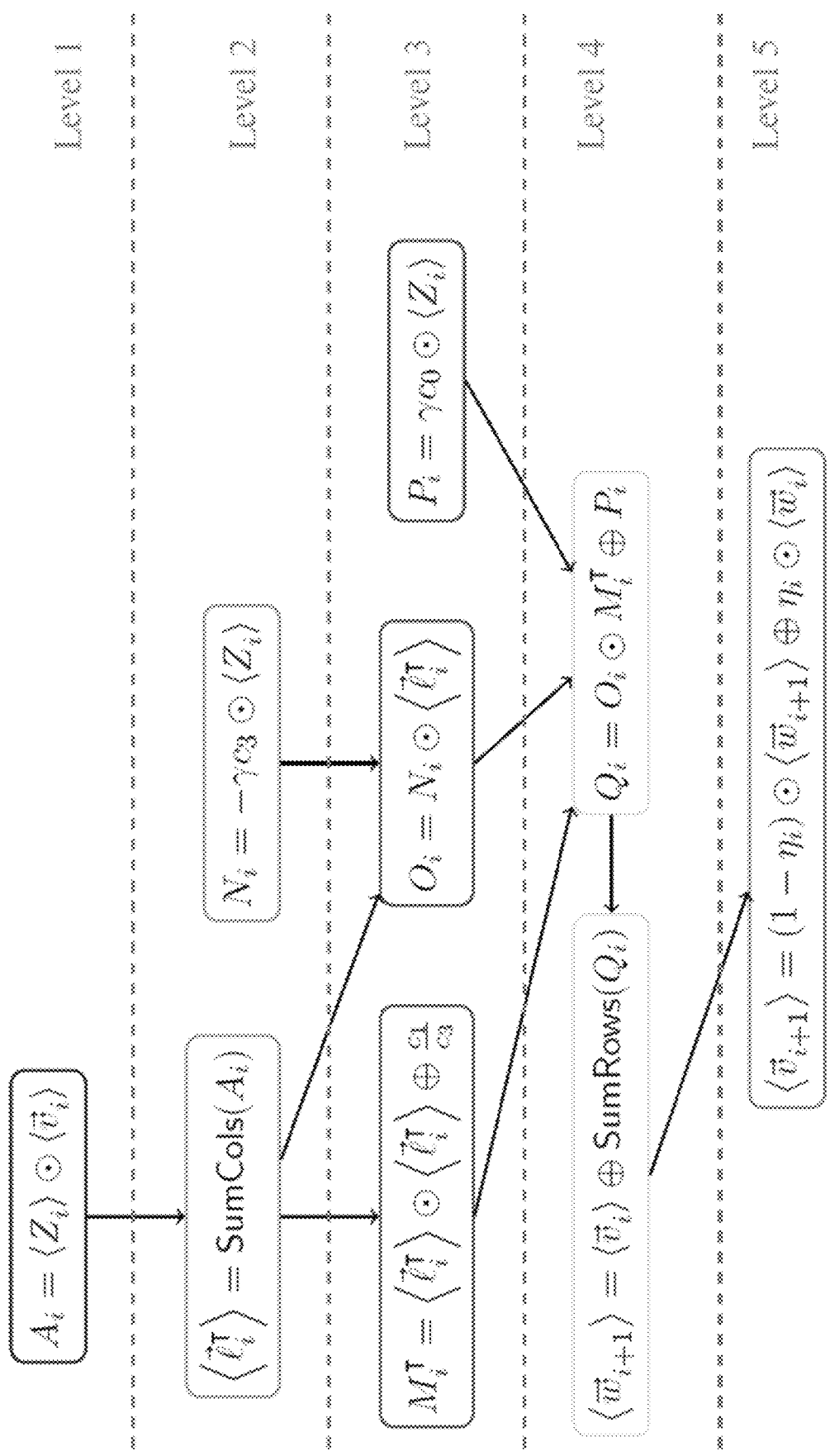
FIG. 2 illustrates a depth-five circuit for mini-batch training iteration that can be optimized using techniques described in greater detail below, in accordance with at least one embodiment.

Input: Tweaked mini-batch $Z_i \in \mathbb{R}^{f \times g}$, where $\ell_i$ is the $i^{th}$ random mini-batch, $\vec{w}_i$, $\vec{v}_i \in \mathbb{R}^g$, and parameters $\gamma, \eta_i$ Output: $\vec{w}_{i+1}, \vec{v}_{i+1} \in \mathbb{R}^g$ 1. $\vec{\ell}_i = Z_i \cdot \vec{v}_i$ 2. $\vec{c}_i = \gamma \cdot Z_i^T \cdot \vec{\sigma}'(-\vec{\ell}_i)$ 3. $\vec{w}_{i+1} = \vec{v}_i + \vec{c}_i$ 4. $\vec{v}_{i+1} = (1 - \eta_i)\vec{w}_{i+1} + \eta_i \vec{w}_i$ 5. return $\vec{w}_{i+1}, \vec{v}_{i+1}$ In at least one embodiment, a homomorphic equivalent of Algorithm 6 is shown below in Algorithm 7. The full circuit for this algorithm is shown in FIG. 2, with a multiplicative depth of 5 which can be further reduced using techniques described in greater detail below.

---

Algorithm 7: Mini-batch training iteration (homomorphic view)

---

Input: Mini-batch $<Z_i>^{[m \times n]}$ and vectors $<\vec{w}_i>^{[m \times n]}, <\vec{v}_i>^{[m \times n]}$.
Output: $<\vec{w}_{i+1}>^{[m \times n]}, <\vec{v}_{i+1}>^{[m \times n]}$ 1. $<\vec{\ell}_i^T> = \mathrm{SumCols}(<Z_i> \odot <\vec{v}_i>)$ 2. $M_i^T = \langle \vec{\ell}_i^T \rangle \odot \langle \vec{\ell}_i^T \rangle \oplus \dfrac{c_1}{c_3}$ 3. $<\vec{c}_i> = \mathrm{SumRows}(((-\gamma c_3 \odot <Z_i>) \odot <\vec{\ell}_i^T>) \odot M_i^T \oplus (\gamma c_0 \odot <Z_i>))$
4. $<\vec{w}_{i+1}> = <\vec{v}_i> \oplus <\vec{c}_i>$
5. $<\vec{v}_{i+1}> = (1 - \eta_i) \odot <\vec{w}_{i+1}> \oplus \eta_i \odot <\vec{w}_i>$
6. return $<\vec{w}_{i+1}>, <\vec{v}_{i+1}>$

---

Techniques described here may be used to perform logistic regression training in the context of a client-server relationship. In at least one embodiment, a client encrypts each mini-batch $<Z_i>$ to be used for training and sends them to the server along with evaluation keys. Some parameters may be sent publicly (e.g., un-encrypted) form, such as the learning rate $\alpha$. In some cases, such as when asymmetric CKKS encryption is being used, the server can generate fresh encryptions of $\vec{0}$ for $<\vec{w}>$ and $<\vec{v}>$, in other cases, these ciphertexts are generated by the client and sends them along with the mini-batches. In some embodiments, ciphertext compression can be utilized with symmetric encryption.

As noted above, the inputs to a circuit or sub-circuit described above are encoded relative to a single fixed encoding unit. The mini-batch size $f$ described above may be chosen to match the first dimension of the encoding unit. However, by using linear algebra operations and encodings described above, the encoding unit can be generalized such that it is no longer necessarily tied to the mini-batch size. In at least some embodiments, mini-batches are divided along both dimensions to allow for even more encoding flexibility. For example, consider training on mini-batches of size 64×128 using CKKS parameters with 4096 plaintext slots. Previous techniques may have required the use of a 64×64 encoding unit, which results in two ciphertexts for the mini-batch and each 128-dimensional column vector (e.g., $\vec{v}$) is also split into two ciphertexts. However, using techniques described above, in at least one embodiment, a 32×128 encoding unit can be used, which results in two ciphertexts for the mini-batch but only one ciphertext for the vector. Thus, by using a generalized encoding structure, the number of ciphertexts involved in the computation can be reduced, which can reduce communication overhead and improve the efficiency and operation of computer systems in at least one embodiment.

Techniques described herein can be utilized to reduce the multiplicative depth of homomorphic circuits. While these techniques are discussed in the context of improving the efficiency of logistic regression training, they can be applied in many other contexts. An example of one technique to reduce the multiplicative depth of a homomorphic circuit is provided below, showing how the multiplicative depth of a mini-batch training iteration as described above in connection with Algorithm 7 can be reduced. As described in greater detail below, the multiplicative depth of a mini-batch training iteration can be reduced from five to four by removing a dependency and duplicating work. Specifically, and in at least one embodiment, the dependency of $<\vec{v}_{i+1}>$ on $<\vec{w}_{i+1}>$ can be reduced by expanding Line 4 of Algorithm 7 in the following manner, first by observing:

$$\langle \vec{v}_{i+1} \rangle = (1 - \eta_i) \odot \langle \vec{w}_{i+1} \rangle \oplus \eta_i \odot \langle \vec{w}_i \rangle$$

$$= (1 - \eta_i) \odot \langle \vec{v}_i \rangle \oplus (1 - \eta_i) \langle \vec{c}_i \rangle \oplus \eta_i \odot \langle \vec{w}_i \rangle$$

Due to the linearity of SumRows, it can be further stated:

$$\langle \vec{c}'_i \rangle = (1 - \eta_i) \langle \vec{c}_i \rangle =$$

$$SumRows\Big(\big((-(1-\eta_i)\gamma c_3 \odot \langle Z_i \rangle) \odot \langle \vec{\ell}_i^T \rangle\big) \odot M_i^T \oplus ((1-\eta_i)\gamma c_0 \odot \langle Z_i \rangle)\Big)$$

Figure 3:
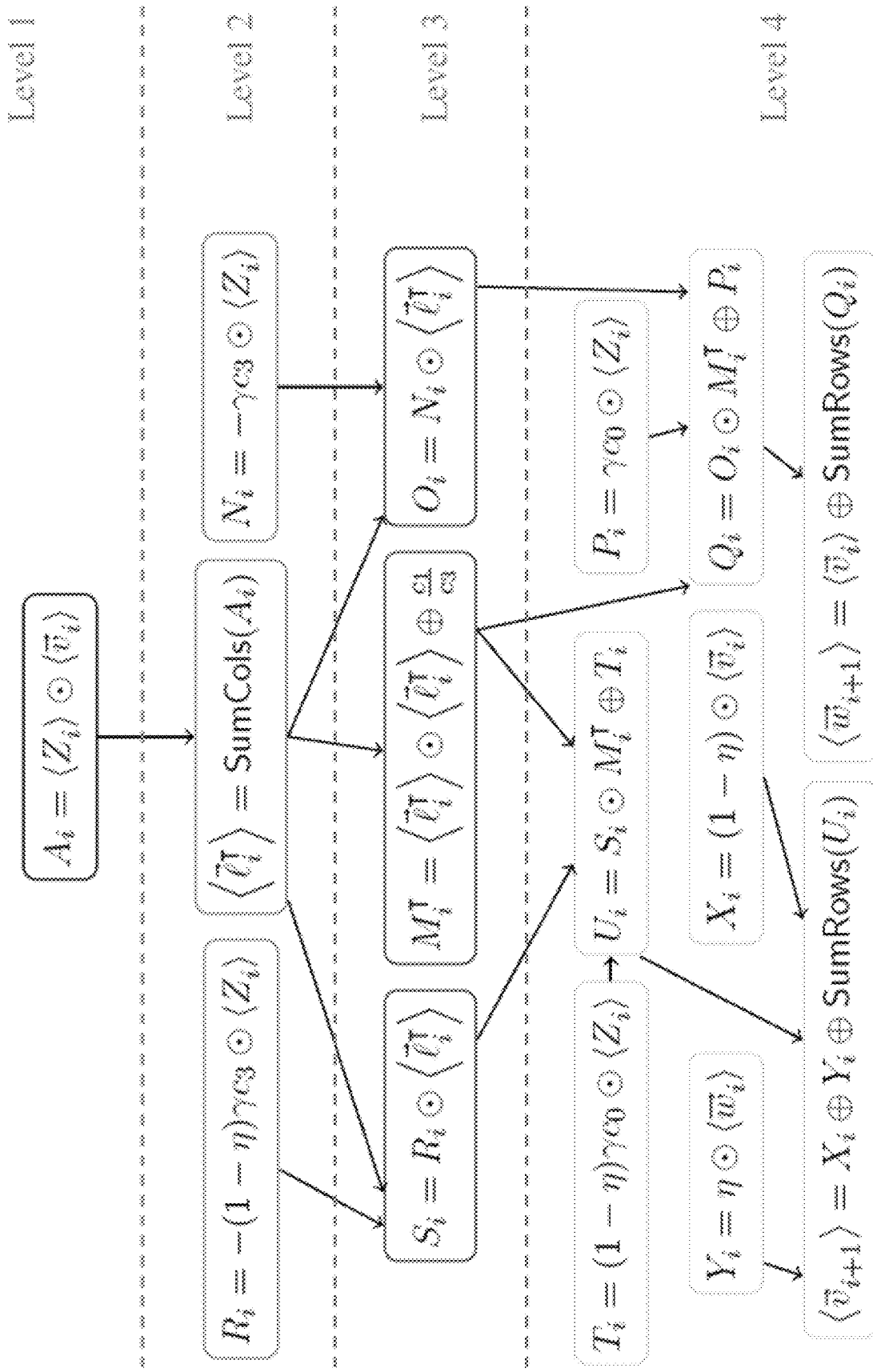
FIG. 3 illustrates a depth-four circuit for mini-batch training iteration that can be further optimized using techniques described in greater detail below, in accordance with at least one embodiment.

Thus, the dependency of $\vec{w}_{i+1}$ can be removed when computing $\vec{v}_{i+1}$ which allows $\langle \vec{c}'_i \rangle$ to be computed in parallel with $\langle \vec{c}_i \rangle$ and reduce the depth of a mini-batch training iteration circuit to four, as shown in FIG. 3. While this reduction in circuit depth increases the number of gates that are to be evaluated, a parallel evaluator can be used to parallelize the computation of several gates so that there need not be a corresponding increase in evaluation time. Overall computation time of homomorphic circuits may be proportional to the multiplicative depth of the circuit, meaning that the multiplicative depth of a homomorphic circuit may be more indicative of run-time performance rather than the total number of gates in the circuit, in at least one embodiment.

Techniques described herein may be utilized to reduce the multiplicative depth of a homomorphic circuit and may be used in conjunction with the techniques described above in connection with FIG. 3 to further reduce the multiplicative depth of a circuit for logistic regression training. In at least one embodiment, parallelism of the homomorphic circuit is increased by removing the dependency of $\ell_i$ on $\vec{v}_i$ from a previous iteration (see Algorithm 5). $\vec{\ell}_i$ may be treated as an input to each training iteration and compute $\vec{\ell}_{i+1}$ in parallel with $\vec{v}_{i+1}$ and $\vec{w}_{i+1}$. This introduces asymmetry in the homomorphic circuit between even and odd training iteration; loop unrolling techniques can be utilized to compute two training iterations. By using techniques described herein to design the circuit for the unrolled loop, the first level of multiplications can be made independent of the outputs of the previous loop iteration. Then, pipelining can be employed to start the next unrolled loop iteration before completing the previous iteration, in accordance with at least one embodiment. As described in greater detail below, techniques described herein can be used to design a homomorphic circuit with a multiplicative depth of 5 for two iterations of a loop for logistic regression training, yielding an average depth of 2.5 per iteration.

As described above, the dependency of $\vec{v}_{i+1}$ on $\vec{w}_{i+1}$ can be removed so that these values are computed in parallel, in at least one embodiment. Similarly, the definition of $\vec{v}_{i+1}$ is substituted into $\vec{\ell}_{i+1}$ to remove a dependency and allow for $\vec{\ell}_{i+1}$ to be computed in parallel with $\vec{v}_{i+1}$ and $\vec{w}_{i+1}$, in at least one embodiment. Accordingly, the definition of $\vec{\ell}_{i+1}$ from Algorithm can be expanded in the following manner:

$$\vec{\ell}_{i+1} = Z_{i+1} \cdot \vec{v}_{i+1}$$

-continued $$= Z_{i+1} \cdot \Big((1-\eta_i)\big(\vec{v}_i + \gamma \cdot Z_i^T \cdot \vec{\sigma}'(-\vec{\ell}_i)\big) + \eta_i \vec{w}_i\Big)$$

$$= Z_{i+1} \cdot \Big((1-\eta_i) \cdot \vec{v}_i + (1-\eta_i)\gamma \cdot Z_i^T \cdot \vec{\sigma}'(-\vec{\ell}_i) + \eta_i \vec{w}_i\Big)$$

$$= (1-\eta_i) \cdot Z_{i+1} \cdot \vec{v}_i + (1-\eta_i)\gamma \cdot Z_{i+1} Z_i^T \cdot \vec{\sigma}'(-\vec{\ell}_i) + \eta_i \cdot Z_{i+1} \cdot \vec{w}_i$$

In at least one embodiment, a multiple of $Z_{i+1} Z_i^T$, which has no computational dependencies, is computed or precomputed rather than sequentially multiplying by the two mini-batch matrices as in the other circuits. Homomorphically, the goal is to compute $\langle \vec{\ell}_{i+1}^T \rangle$, since this value will be needed to subsequently compute $\langle \vec{v}_{i+2} \rangle$ and $\langle \vec{w}_{i+2} \rangle$.

However, $\vec{v}_i$ is encoded as a column vector, so the result of homomorphically computing the first term is an encoded row vector. On the other hand, given $\langle \vec{\ell}_i^T \rangle$ as in previous circuits, the middle term is the product of a (single) matrix and a row vector, which results in an encoded column vector. This is a problem because an encoded row vector and encoded column vector cannot be added together. To solve this problem, $\langle \vec{\ell}_{i+1}^T \rangle$ is homomorphically computed by taking the transpose of the middle term: $(1-\eta_i)\gamma \cdot \vec{\sigma}'(-\vec{\ell}_i^T) \cdot Z_i Z_{i+1}^T$. Mathematically, transposing the middle term corresponds to mixing row and column vectors, but homomorphically, each term will be encoded row vectors. This term is similar to the homomorphic computation of $\langle \vec{c}_i \rangle$, except that the sigmoid is computed on the row vector $\vec{\ell}_i^T$ and the square matrix $Z_i Z_{i+1}^T$ is used rather than $\langle Z_i \rangle$. These changes can be accommodated by first defining: $M_i = \langle \vec{\ell}_i \rangle \odot \langle \vec{\ell}_i \rangle \oplus c_1/c_3$. Then:

$$\langle (1-\eta_i)\gamma \cdot \vec{\sigma}'(-\vec{\ell}_i^T) \cdot Z_i Z_{i+1}^T \rangle =$$

$$SumCols\Big(\big((-(1-\eta_i)\gamma c_3 \odot \langle Z_{i+1} Z_i^T \rangle) \odot \langle \vec{\ell}_i \rangle\big) \odot M_i \oplus \big((1-\eta_i)\gamma c_0 \odot \langle Z_{i+1} Z_i^T \rangle\big)\Big)$$

Returning to the problem of computing $\langle \vec{\ell}_{i+1}^T \rangle^{[m \times n]}$, the transpose of the middle term above can be computed as described above, and the outer terms can be added to fully compute $\langle \vec{\ell}_{i+1}^T \rangle^{[m \times n]}$:

$$\langle \vec{\ell}_{i+1}^T \rangle = (1-\eta_i) \odot SumCols(\langle Z_{i+1} \rangle \odot \langle \vec{v}_i \rangle) \oplus$$

$$SumCols\Big(\big((-(1-\eta_i)\gamma c_3 \odot \langle Z_{i+1} Z_i^T \rangle) \odot \langle \vec{\ell}_i \rangle\big) \odot M_i \oplus$$

$$\big((1-\eta_i)\gamma c_0 \odot \langle Z_{i+1} Z_i^T \rangle\big)\Big) \oplus \eta_i \odot SumCols(\langle Z_{i+1} \rangle \odot \langle \vec{w}_i \rangle)$$

Figure 4:
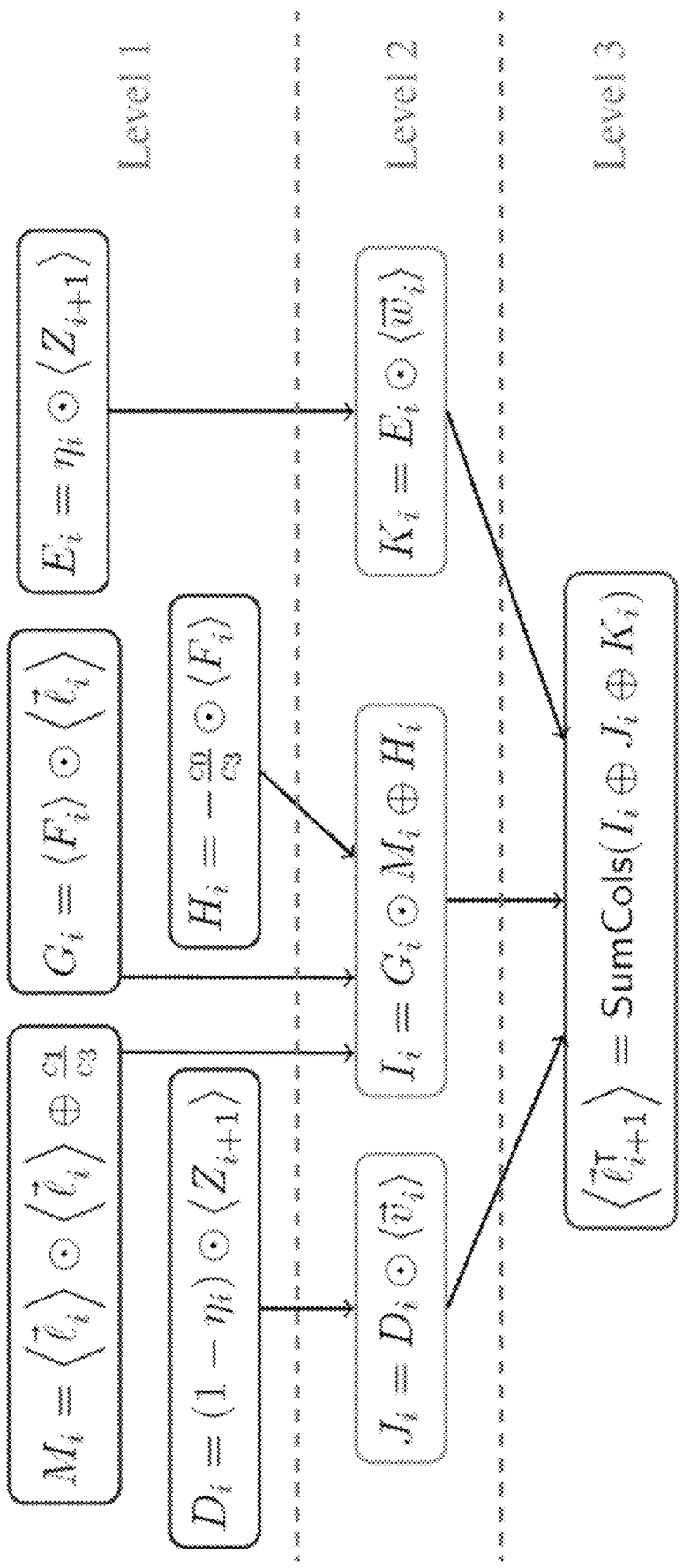
FIG. 4 illustrates a depth-three circuit for computing $<\vec{\ell}_{i+1}^T>$, in accordance with at least one embodiment.

Note that techniques described above relating to matrix-matrix and vector-matrix multiplication can be utilized here because the middle term involves square matrices, while the outer terms involve rectangular matrices. For now, assuming that $F_i = -\gamma c_3 (1-\eta_i) Z_{i+1} Z_i^T$ is available as an input to this computation, which will be addressed in further detail below, this leads to a depth three circuit for computing $\langle \vec{\ell}_{i+1}^T \rangle$, which in at least one embodiment is illustrated in FIG. 4. In the context of FIG. 4, the extended SumCols linear map may be used since the dimension of $I_i$ and $J_i$ do not match.

Figure 5:
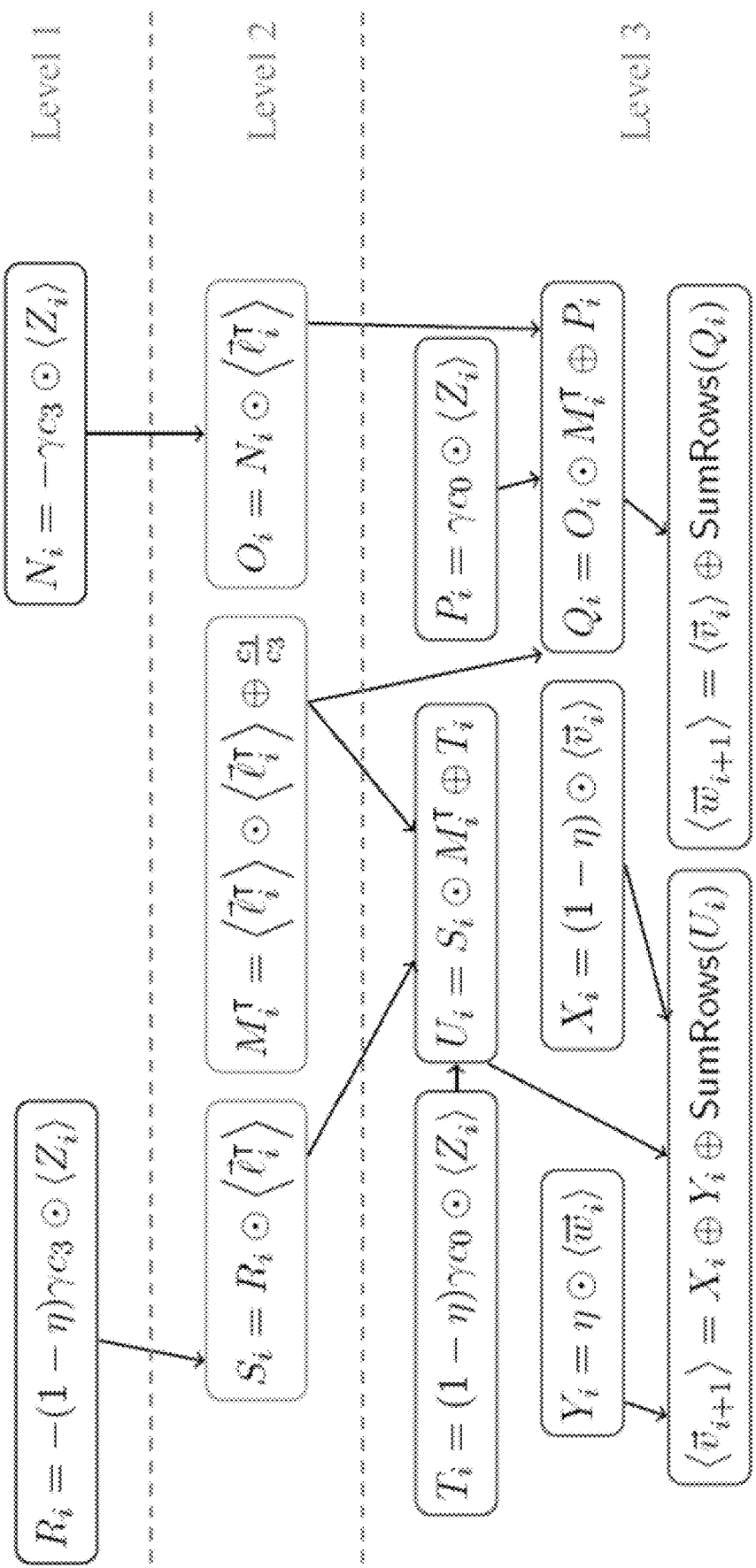
FIG. 5 illustrates a depth-three circuit for computing $<\vec{v}_{i+1}>$ and $<\vec{w}_{i+1}>$ for logistic regression training, in accordance with at least one embodiment.

With regard to computing $<\vec{v}_{i+1}>$ and $<\vec{w}_{i+1}>$, if $<\vec{\ell}_i^T>$ is treated as an input, FIG. 3 can be modified to compute $<\vec{v}_{i+1}>$ and $<\vec{w}_{i+1}>$ with depth three by removing the temporary value $<A_i>$. FIG. 5 illustrates this circuit, in at least one embodiment.

Figure 6:
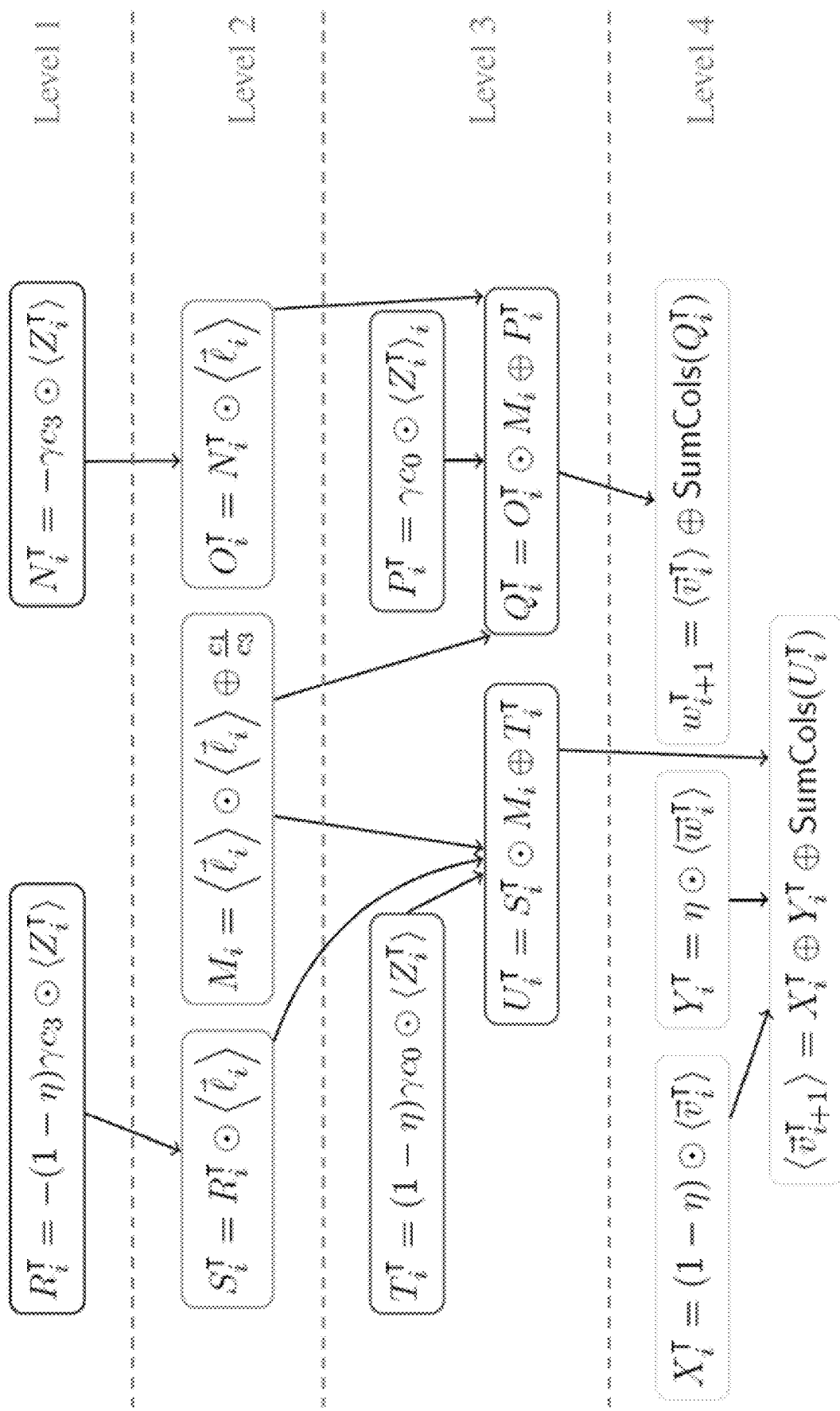
FIG. 6 illustrates a depth-four circuit for computing $<\vec{v}_{i+1}^T>$ and $<\vec{v}_{i+1}^T>$ for logistic regression training, in accordance with at least one embodiment.
Figure 7:
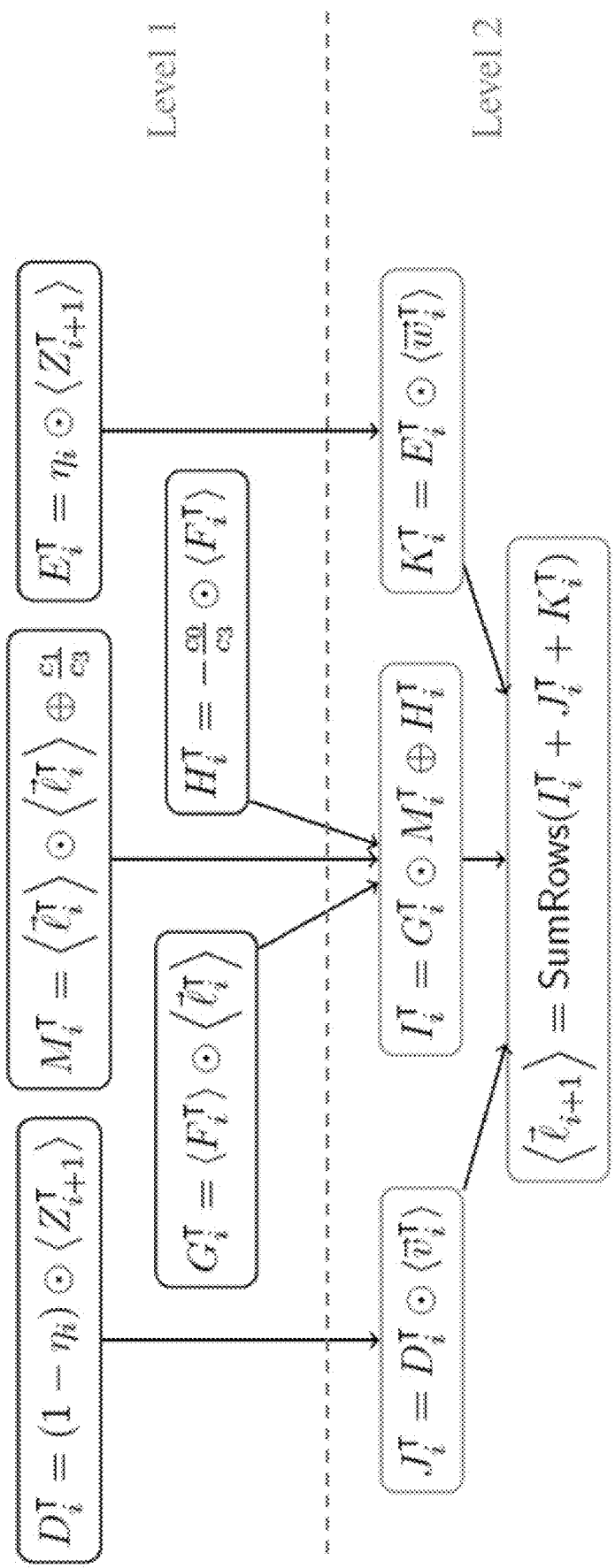
FIG. 7 illustrates a depth-two circuit for computing $<\vec{\ell}_{i+1}>$ for logistic regression training, in accordance with at least one embodiment.
Figure 8:
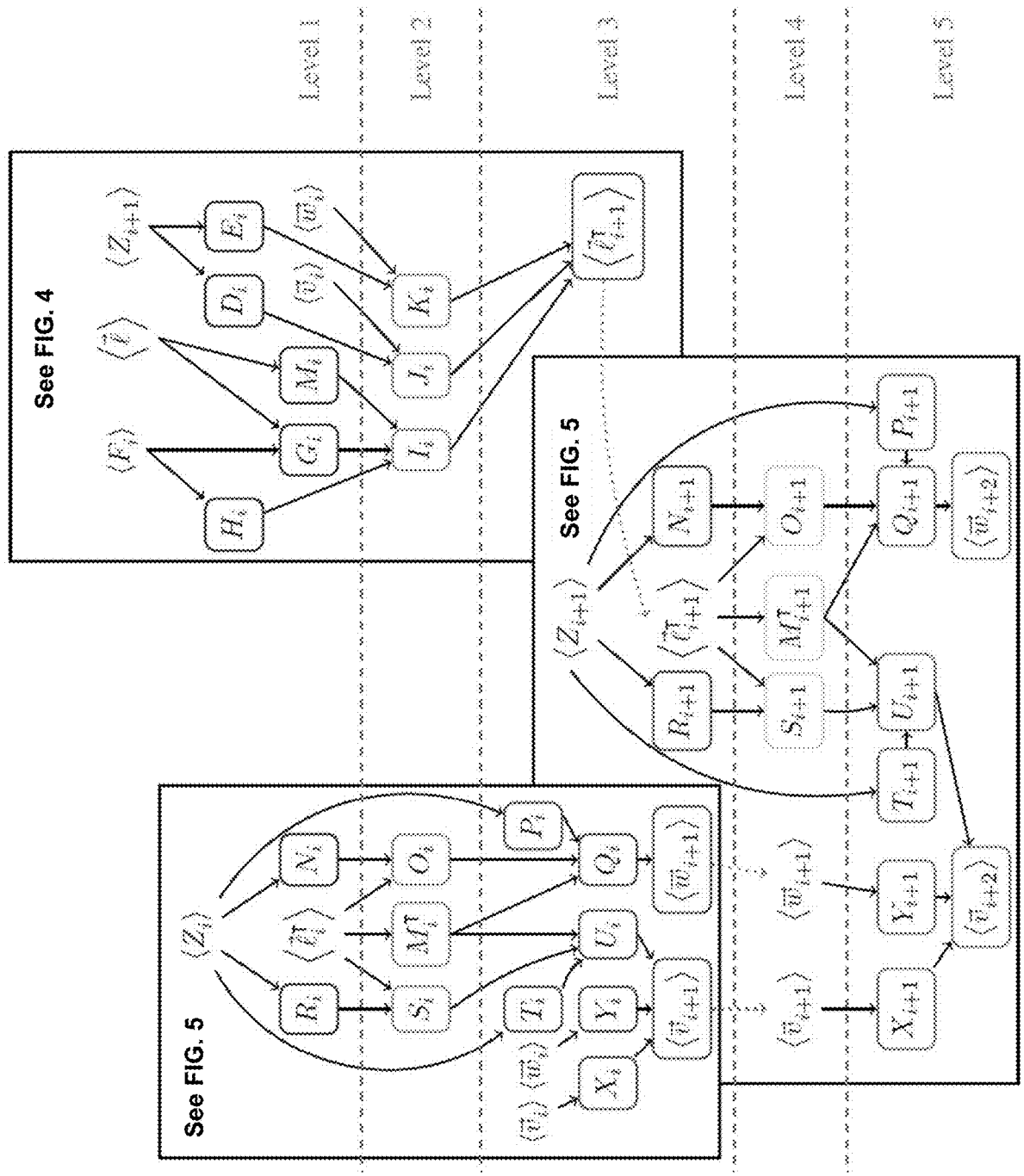
FIG. 8 illustrates a depth-five circuit for computing $<\vec{v}_{i+2}>$ and $<\vec{w}_{i+2}>$ for logistic regression training, in accordance with at least one embodiment.
Figure 9:
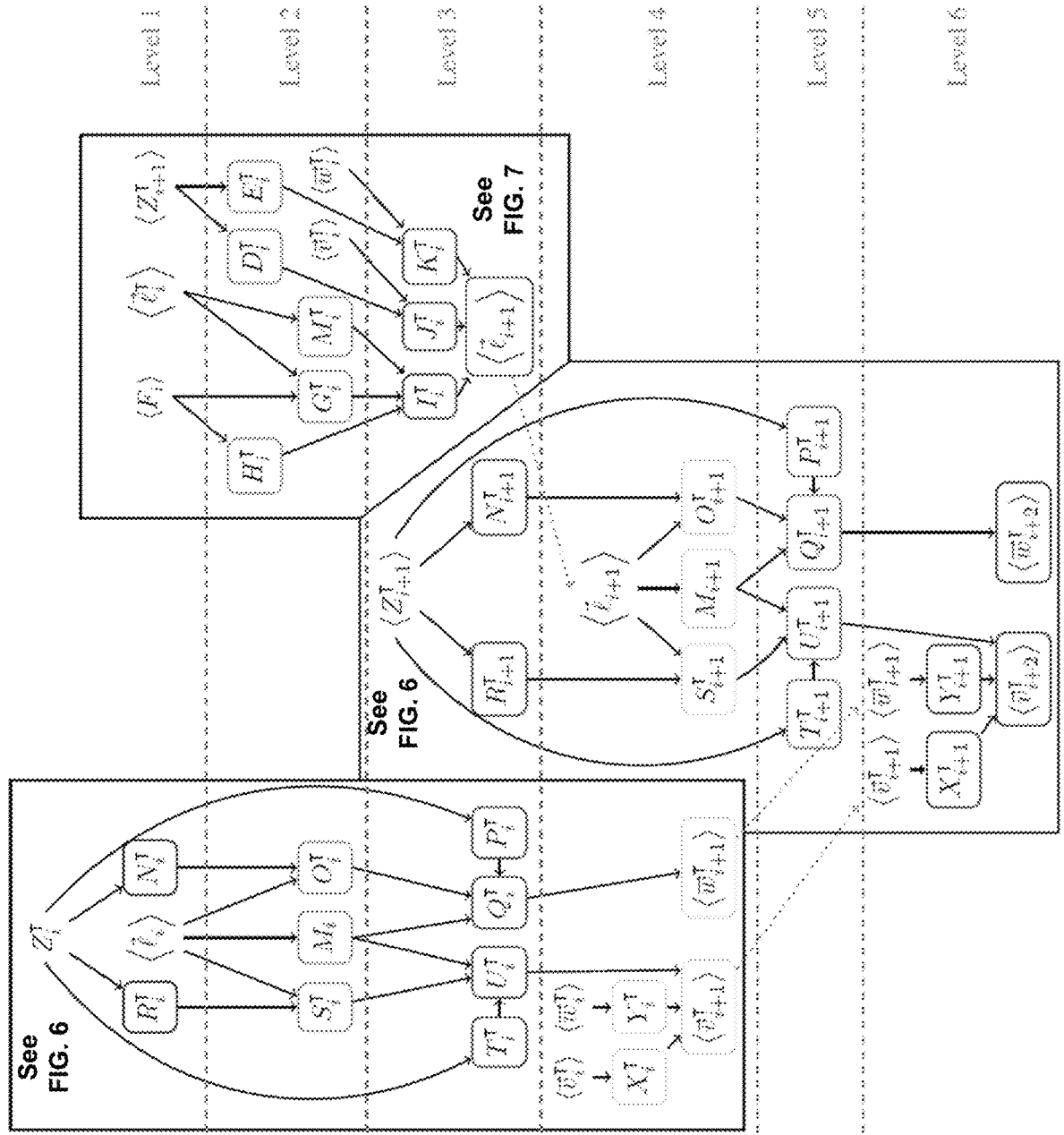
FIG. 9 illustrates a depth-six circuit for computing $<\vec{v}_{i+2}^T>$ and $<\vec{w}_{i+2}^T>$ for logistic regression training, in accordance with at least one embodiment.
Figure 10:
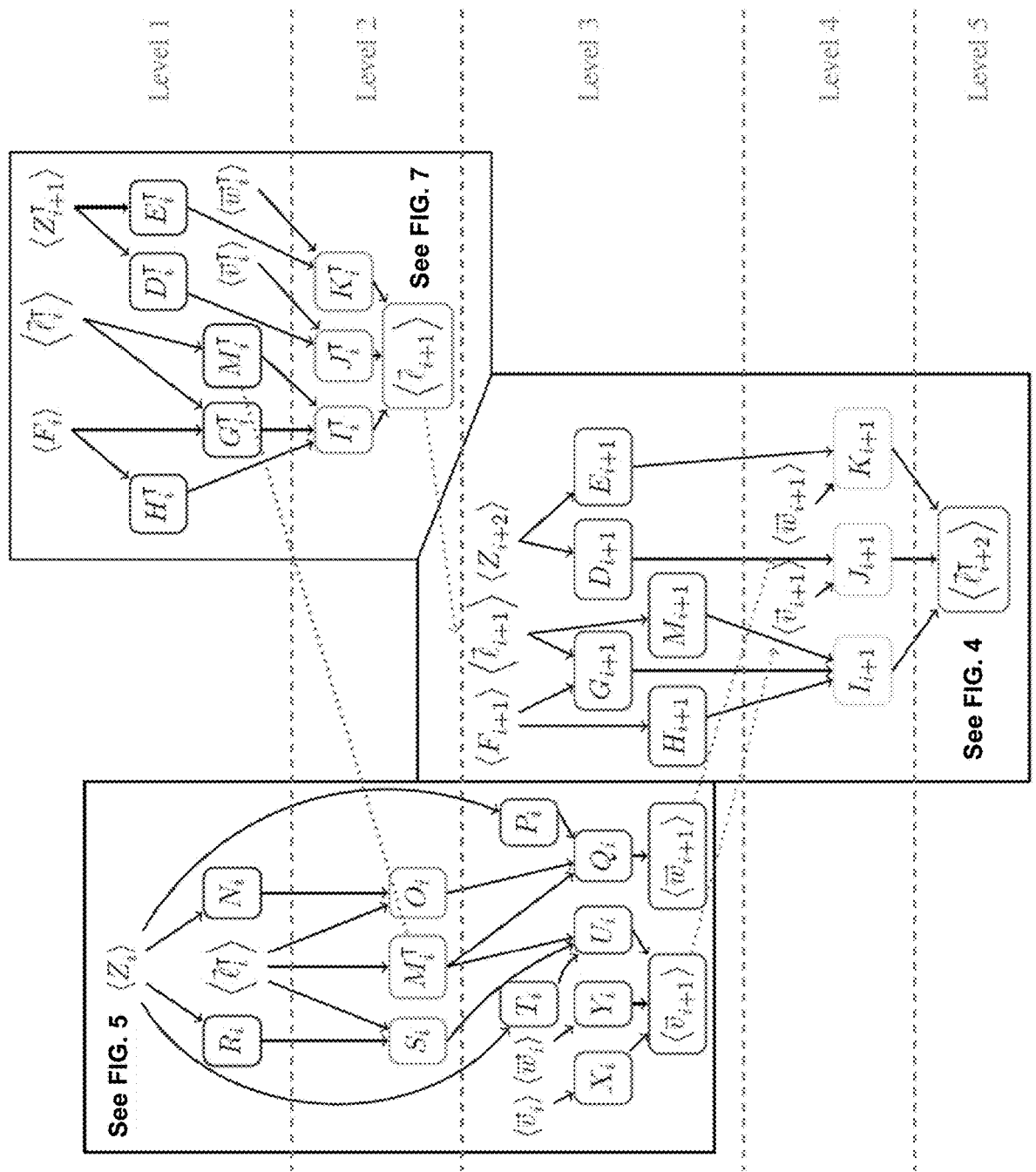
FIG. 10 illustrates a depth-five circuit for computing $<\vec{\ell}_{i+2}^T>$, for logistic regression training, in accordance with at least one embodiment.
Figure 11:
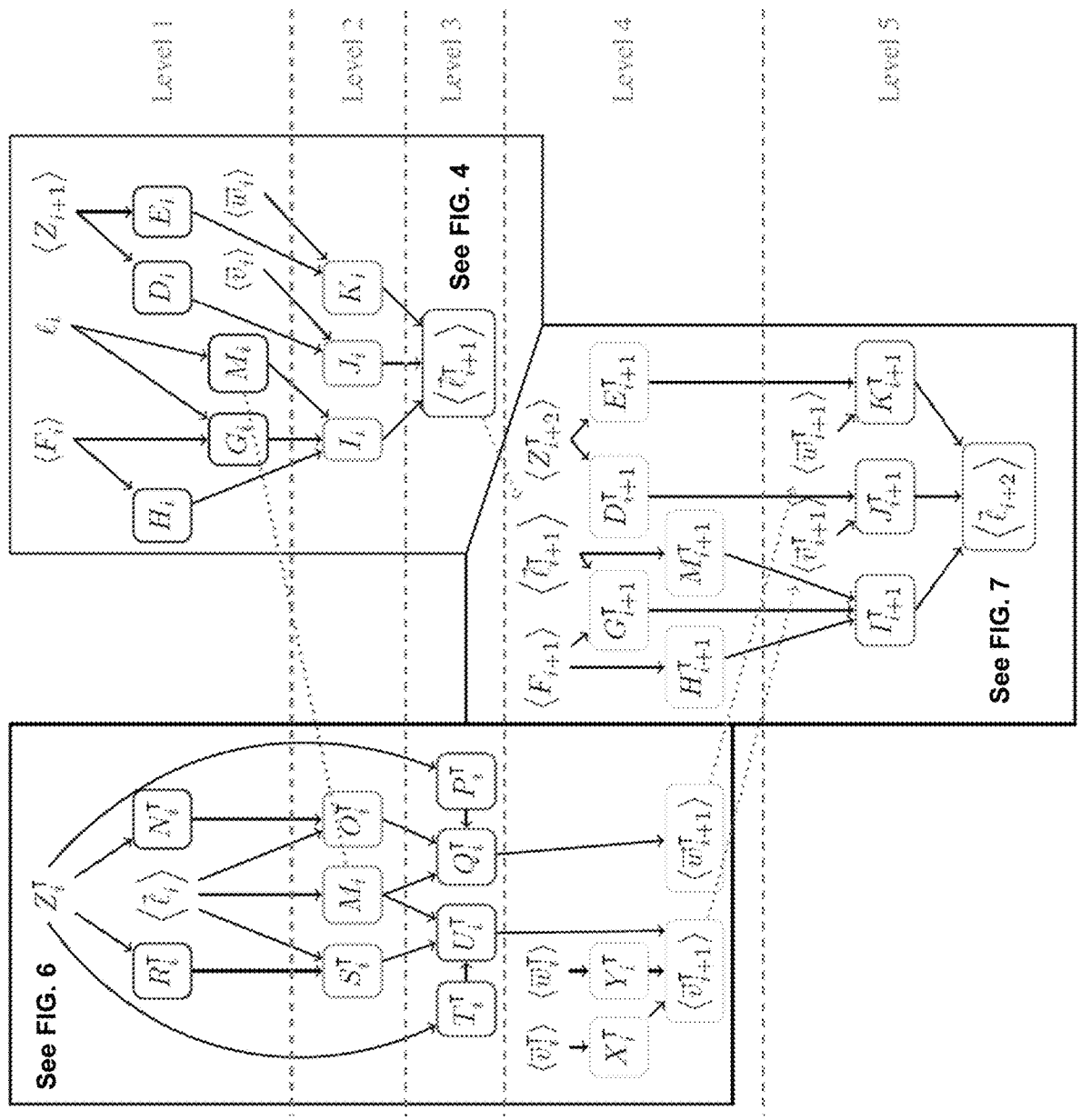
FIG. 11 illustrates a depth-five circuit for computing $<\vec{\ell}_{i+2}>$ for logistic regression training, in accordance with at least one embodiment.

As is noted above, as part of creating a low-depth circuit for $<\vec{\ell}_{i+1}^T>$ (e.g., as shown in FIG. 4), additional dependencies have been introduced to the circuit. At first glance, FIG. 4 requires $<\vec{\ell}_i>$, which can be computed by taking the transpose of FIG. 4. However, this transpose circuit requires $<\vec{w}^T>$ and $<\vec{v}^T>$, which doubles the size of the circuit because, both $<\vec{v}>$, $<\vec{w}>$, and $<\vec{\ell}>$ and their transposes $<\vec{v}^T>$, $<\vec{w}^T>$, and $<\vec{\ell}^T>$ are to be computed for each iteration. The following table provides a table of these four circuit components:

| Circuit | Depth | Inputs | Outputs |
|---|---|---|---|
| FIG. 5 | 3 | $<\vec{w}_i>^{[m \times n]}, <\vec{v}_i>^{[m \times n]},$ $<\vec{\ell}_i^T>^{[m \times n]}, <Z_i>^{[m \times n]}$ | $<\vec{w}_{i+1}>^{[m \times n]}, <\vec{v}_{i+1}>^{[m \times n]}$ |
| FIG. 6 | 4 | $<\vec{w}_i^T>^{[m \times n]}, <\vec{v}_i^T>^{[m \times n]}$ | $<\vec{w}_{i+1}^T>^{[m \times n]}, <\vec{v}_{i+1}^T>^{[n \times m]}$ |
| FIG. 7 | 2 | $<\vec{\ell}_i>^{[m \times n]}, [Z_i^T]^{[n \times m]}$ $<F_i^T>^{[m \times n]}, <\vec{\ell}_i^T>^{[m \times n]}, <Z_{i+1}^T>^{[m \times n]},$ $<\vec{w}_i^T>^{[m \times n]}, <\vec{v}_i^T>^{[m \times n]}$ | $<\vec{\ell}_{i+1}>^{[n \times m]}$ |
| FIG. 4 | 3 | $<F_i>^{[m \times n]}, <\vec{\ell}_i>^{[m \times n]}, <Z_{i+1}>^{[m \times n]}$ $<\vec{w}_i>^{[m \times n]}, <\vec{v}_i>^{[m \times n]}$ | $<\vec{\ell}_{i+1}^T>^{[m \times n]}$ |

While the components in the table are misaligned in terms of multiplicative depth, loop unrolling techniques can be utilized to review two consecutive iterations to achieve better alignment and lower depth. FIGS. 8, 9, 11, and 10 show how to align the four figures in the table so that all required inputs are computed in time. By running these four circuits in parallel, two consecutive iterations of a training loop can be computed with depth six, giving an average of depth three per training iteration.

Techniques described herein may be utilized to reduce the multiplicative depth of two consecutive training iteration of a logistic regression training by one. It is noted that FIGS. 8, 10, and 11 have depth five while the first computation level in FIG. 9 (with depth six) involves only computing scalar multiples of $Z_i^T$. Rather than executing multiple iterations by executing the circuits sequentially, pipelining can be used to begin evaluating the next two training iterations prior to finishing the evaluation of the circuit for the previous two training iterations, bringing the depth for two iterations to five, according to at least one embodiment. The values computed in the first level of the full circuit in this embodiment are: $R_i^T = -\gamma c_3 (1 - \eta_i) \odot <Z_i^T>$ and $N_i^T = -\gamma c_3 \odot <Z_i^T>$.

Mixed encoding units can be used for compactness. The "uniform-unit" circuits described thus far use the same encoding unit to encode a value and its transpose. As a result, it is not optimal in terms of the number of ciphertexts used to encode objects and total number of operations performed. For example, the row vector $\vec{\ell}_i^T$ may be encoded as the columns of an m×n encoding unit. Circuits described above also use this encoding unit for $\vec{\ell}_i$, which is encoded as the rows of an m×n unit. This may result in padding or multiple ciphertexts depending on the number of training features.

Using different encoding units for certain values may result in a more compact encoding and using the techniques described above for linear algebra operations with mixed encoding units. For example, a compact encoding may use an m×n encoding unit for $D_i$, $E_i$, $J_i$, $K_i$, $\vec{\ell}_i^T$, $M_i^T$, $N_i$, $O_i$, $P_i$, $Q_i$, $R_i$, $S_i$, $T_i$, $U_i$, $\vec{v}_i$, $\vec{w}_i$, $X_i$, $Y_i$, and $Z_i$, and an n×m encoding unit may be used for the transpose of those values. Likewise, values $F_i$, $G_i$, $H_i$, $I_i$, and their transposes may be encoded relative to an m×n encoding unit. With these changes, all computations in the circuit except $G_i$, $I_i$, and $\vec{\ell}_i$ still involve a single encoding unit for all inputs and outputs. The exceptions can be computed below as follows:

$$<G_i>^{[m \times n]} = <F_i>^{[m \times n]} \odot \text{Log Trans}(<\vec{\ell}_i<^{[n \times m]})$$

$$<I_i>^{[m \times n]} = <G_i>^{[m \times n]} \odot \text{Log Trans}(<M_i>^{[n \times m]}) \oplus <H_i>^{[m \times n]}$$

$$<\vec{\ell}_{i+1}>^{[n \times m]} = \text{SumCols}(\text{Log Trans}(<I_i>^{[m \times n]}) \oplus <J_i>^{[m \times n]} \oplus <K_i>^{[m \times n]})$$

Certain conditions may apply in order to use mixed encoding unit algorithms with the compact version of the circuit. In particular, for ƒ×g mini-batches and an m×n encoding unit, the compact circuit may be used only when ƒ≤m≤n. For example, with CKKS parameters with $2^{15}$ plaintext slots, the compact circuit can be used when the mini-batch size (f) is ≤128. In many embodiments, this restriction is not burdensome since the mini-batches tend to be small (e.g., 32). Even when the conditions for the compact circuit are not met, the uniform-unit circuit can still be used, since it has no restriction on batch size or encoding unit dimensions.

Figure 12:
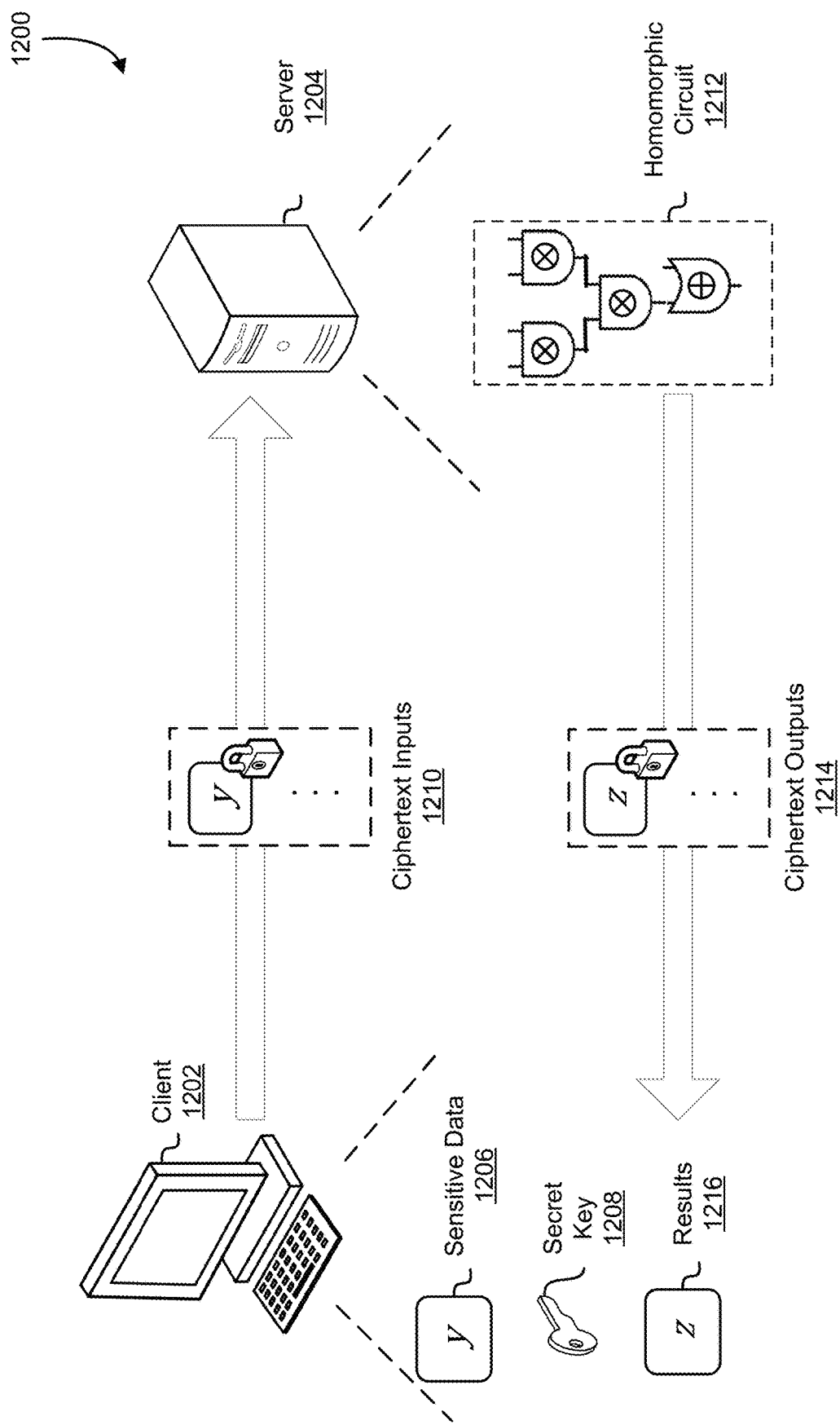
FIG. 12 shows an illustrative example of a computing environment in which various embodiments can be implemented.

FIG. 12 shows an illustrative example of a computing environment 1200 in which various embodiments can be implemented. In at least one embodiment, FIG. 12 illustrates a computing environment 1200 with a client 1202 and a server 1204 (e.g., computing resource service provider) that communicate with each other such that the server 1204 performs provably secure computations on ciphertexts. In at least one embodiment, FIG. 12 is implemented in the context of various other embodiments described in this disclosure, such as those discussed in connection with FIGS. 1-11 and 13-17. For example, techniques described in connection with FIG. 12 may be utilized so that a client 1202 utilized a server 1204 to perform logistic regression training using homomorphic encryption techniques such that protected input and output data are kept secret from the server 1204 and only accessible to the client 1202.

In at least one embodiment, client 1202 encrypt each mini-batch $Z_i$ as sensitive data. However, the low-depth circuits described above require additional inputs—in particular, the first level of FIGS. 8-11 require $F_0$, $N_0$, $R_0$, and their transposes, and $Z_i^T$ are needed throughout the computation, in accordance with at least one embodiment. These values can be computed by the client 1202 or server 1204, and there are many possible tradeoffs between which values are computed by the client and which are computed by the server. Various options are described below.

In at least one embodiment, the client 1202 encrypts $Z_i$, $Z_i^T$, the matrix products $F_i$, $F_i^T$, and in the case of symmetric encryption, the all-0 vectors $\vec{w}_0$, $\vec{w}_0^T$, $\vec{v}_0$, $\vec{v}_0^T$, $\vec{\ell}_0$, $\vec{\ell}_0^T$; likewise, the server 1204 computes the initial loop variables $N_0$, $N_0^T$, $R_0$, $R_0^T$. In such embodiments, the client may send approximately 4k encrypted inputs for k iterations. From a performance perspective, there is additional overhead involved in computing the first iteration (e.g., server performs additional computations for $R_0^T$, etc.). The overall depth of a circuit according to such a design may be 2.5k+1 for k iterations.

In at least one embodiment, the server 1204 can be used to compute most of $F_i$ and $F_i^T$ (not depicted in FIGS. 8-11). Compared to the client-focused embodiment discussed above, this results in more server computation but reduces client computation and communication overhead. In at least one embodiment, the client 1202 encrypts $Z_i$, $Z_i^T$, $F_0$, $F_0^T$, (and in the case of symmetric encryption, the all-zero vectors $\vec{w}_0$, $\vec{w}_0^T$, $\vec{v}_0$, $\vec{v}_0^T$, $\vec{\ell}_0$, $\vec{\ell}_0^T$) and provides these quantities over communications network to the server 1204. This circuit also has depth 2.5k+1 for k iterations. However, as the number of training iterations increases, the amount of client computation saved increases and communication savings increase as well. So long as there is sufficient parallelism available on the evaluator (e.g., server-side), this approach can be used to reduce client computation and communications at no additional runtime cost.

In at least some embodiments, client 1202 (e.g., a client computer system) provides ciphertexts to a computing resource service provider in connection with a request to perform a series of computations. For example, the client may be a first organization with sensitive/protected data 1206 that it does not want to expose in plaintext to a second organization that operates the server 1204. The sensitive/protected data 1206 may be encrypted using a secret key 1208 (e.g., symmetric key or asymmetric private key) to produce a ciphertext. The ciphertext may be an encrypted version of sensitive data that should not be shared between the client and the computing resource service provider. The ciphertext may be encrypted using a cryptographic key (e.g., symmetric key or asymmetric private key) that the computing resource service provider lacks access to. One or more inputs to a program may be encrypted to generate one or more ciphertext inputs 1210. The client 1202 may transmit the one or more ciphertext inputs 1210 to the server 1204 in connection with a request to execute a program (e.g., run logistic regression training on the one or more ciphertexts). A client may refer to a client computer system or a customer controlling a client computer system, based on context.

Figure 14:
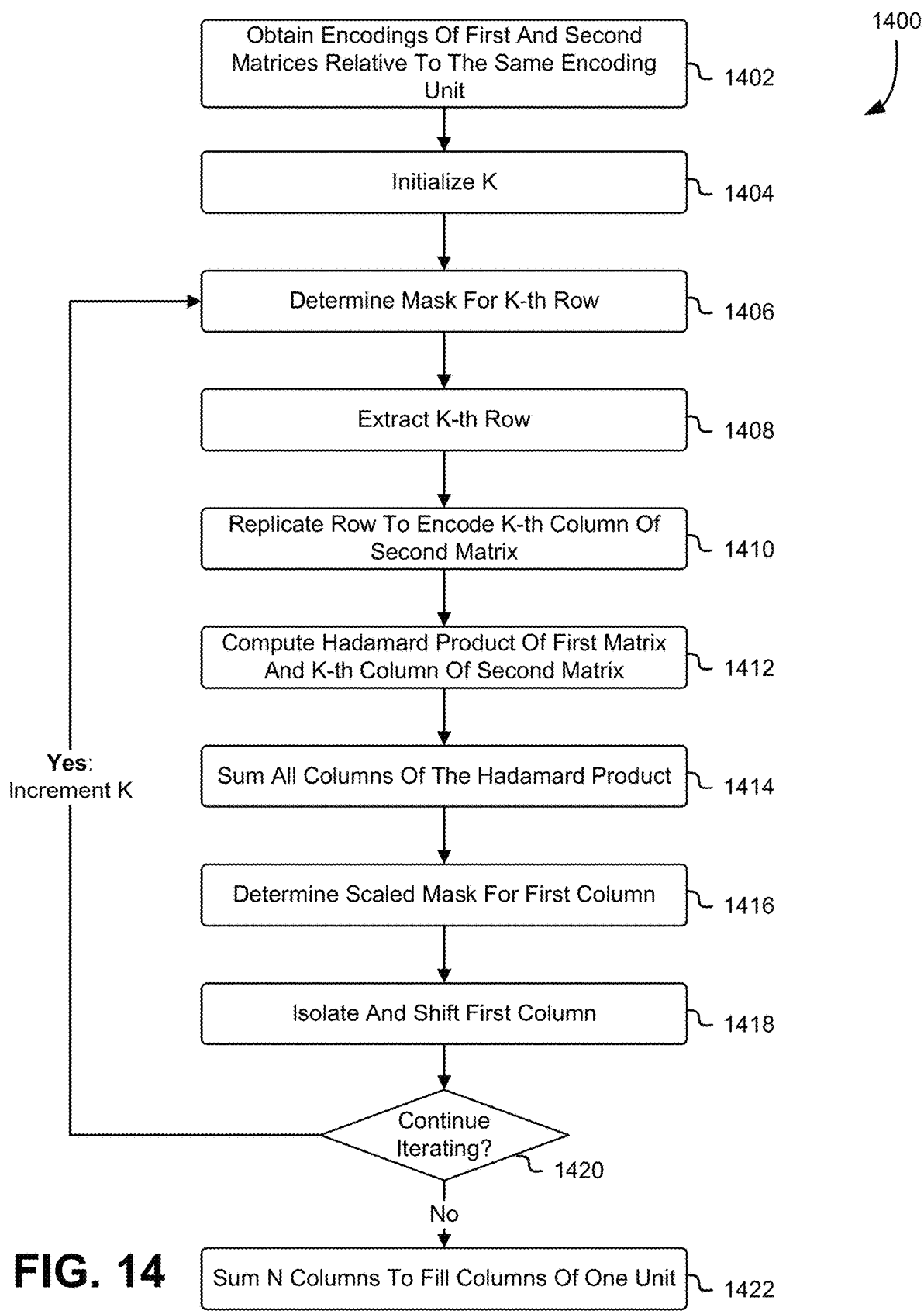
FIG. 14 shows an illustrative example of a process to perform a matrix-matrix multiplication operation viewing the second matrix as a set of columns, in accordance with at least one embodiment.

Server 1204 may be a set of computer servers that provides various computing services which may include computational services that provide cryptographic security assurances. In some cases, cryptographic schemes utilized by server 1204 are provably secure, but this is not necessarily required in all cases. Server 1204 may receive ciphertext inputs 1210 that comprise one or more ciphertexts from client 1202 and execute a program on the ciphertext inputs—for example, to perform logistic regression training. An example of a ciphertext input may be encrypted and encoded mini-batch data for logistic regression training. The program may refer to code written in a human-readable format, such as C/C++ or Haskell that includes a set of operations to be performed using one or more ciphertexts. In at least one embodiment, a compiler obtains the code and generates homomorphic circuit 1212 comprising a series of homomorphic gates. These homomorphic gates may be analogous to traditional non-homomorphic logic gates such as AND gates and OR gates. For example, a program may be represented using a series of homomorphic addition, homomorphic multiplication, and homomorphic rotation gates. Homomorphic gates can be used to perform computations on ciphertexts. The program may be optimized using techniques described herein, such as by using processes or sub-processes described in connection with FIGS. 1-12 and 14-17. For example, code for a program (e.g., logistic regression training) may be converted to a series of homomorphic gates which are then optimized to reduce and/or minimize multiplicative depth. In at least one embodiment, techniques described in connection with FIGS. 14 and 17 are utilized to reduce multiplicative depth by identifying a multiplication gate to optimize and replaces it with a series of two or more homomorphic gates that can include even more homomorphic multiplications, but is structured such that these homomorphic multiplications do not increase the multiplicative depth of the overall circuit, even though it increases the total number of homomorphic gates to be executed.

Accordingly, the computer resource service provider 1204 may perform a series of homomorphic operations on one or more ciphertexts that it receives from the client using an optimized homomorphic circuit to generate one or more ciphertext outputs 1214. The ciphertext outputs 1214 may be transmitted by the computing resource service provider to the client (e.g., as part of a response to a request). The client may receive the ciphertext outputs 1214. In accordance with a homomorphic encryption scheme, the client decrypts each of the received ciphertext outputs 1214 using the secret key 1208 to obtain one or more plaintext results 1216. In some cases, a pair of asymmetric keys are utilized for encryption and decryption. In at least one embodiment, results 1216 refers the results that would have been generated had the program (e.g., logistic regression training) been computed using the plaintext rather than the ciphertext. As a result, the client 1202 is able to utilize the server 1204 to perform a set of computations (e.g., logistic regression training) using ciphertexts of sensitive/protected data that protects the confidentiality of the sensitive/protected data as well as the confidentiality of the results.

In at least some embodiments, homomorphic encryption schemes described herein (e.g., those implemented using server 1204 or other suitable computing entities) meet the CPA-security definition but are not CCA-secure as they lack cryptographically verifiable assurances of integrity by design. In at least some embodiment, for applications that only require semantic security, homomorphic encryption schemes can be used as a drop-in replacement.

Figure 13:
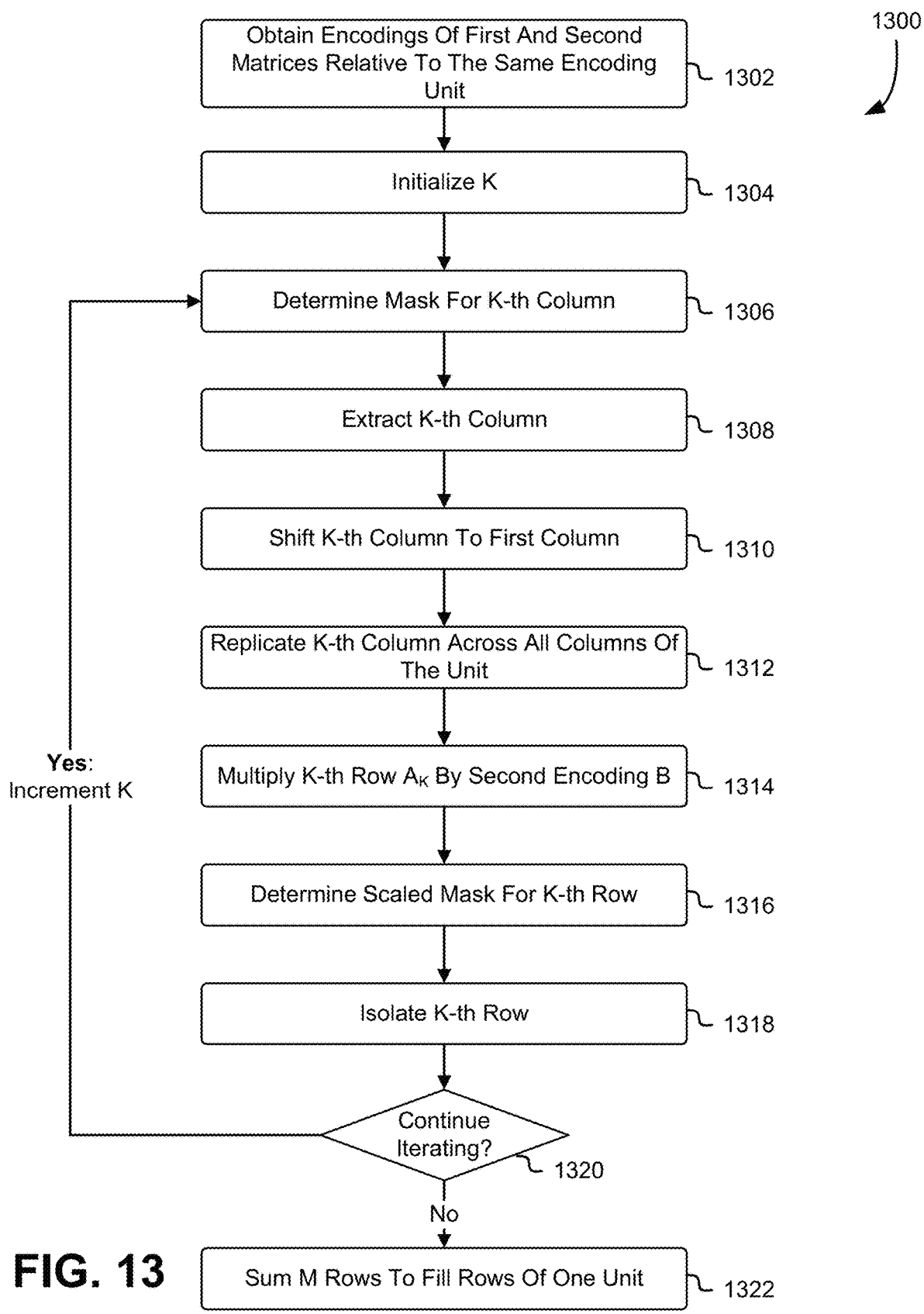
FIG. 13 shows an illustrative example of a process to perform a matrix-matrix multiplication operation viewing the first matrix as a set of rows, in accordance with at least one embodiment.

FIG. 13 shows an illustrative example of a process 1300 to compute a matrix-matrix multiplication operation on encoded matrices, in accordance with at least one embodiment. These encoded matrices may be ciphertexts. While FIG. 13 illustrates a process where the inputs are encoded relative to the same encoding units, the process 1300 can be modified to support matrix-matrix multiplication operations with mixed encoding units, which will be explained in greater detail below. In at least one embodiment, some or all of the process 1300 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1300 may be implemented on various systems described throughout this disclosure, such as those discussed in connection with FIGS. 1-12 and 14-17.

In at least one embodiment, a system performing process 1300 or a portion thereof will obtain 1302 encoding of first and second matrices relative to the same encoding unit. As an illustrative example of process 1300, the operation may receive, as input operands to the matrix-matrix multiplication operation, encodings of matrices $<A^T>^{[m \times n]}$ and $<B>^{[m \times n]}$, where $A \in R^{f \times g}$, $B \in R^{g \times h}$ and compute, as the output, the product $<AB>^{[m \times n]}$. In some cases, the operation may also accept an input scalar $c \in R$ and the output to be computed is $<c \cdot AB>^{[m \times n]}$.

In at least one embodiment, a system performing process 1300 or a portion thereof will initialize 1304 an iterator k. For example, k may be initialized to k and looped for $k=0 \ldots f-1$ based on the dimensions of matrix A.

In at least one embodiment, a system performing process 1300 or a portion thereof will determine 1306 a mask for the k-th column of $<A^T>$. For example, the mask may be defined as matrix $D \in R^{m \times n} = \{d_{i,j}\}$ where $d_{i,j}=1$ if $j \equiv k$ mod n and 0 otherwise. Next, the system may extract 1308 the k-th column for $A_k$ by computing $A_k = \{A_{k,i}\}_{0 \leq i < \lceil g/m \rceil}$, where $A_{k,i} = <D>^{[m \times n]} \odot <A^T>_{i, \lfloor k/n \rfloor}$. Next, the system may shift 1310 the k-th column just computed to the first column, for example, by using Lrot as defined previously: $A_k = \text{Lrot}_{k \text{ mod } n}(A_k)$. This may be replicated 1312 across all columns of the encoding unit, for example, by looping through $j=0 \ldots \log_2 n-1$ and performing the operation $A_k = \text{Rrot}_{2^j}(A_k) \oplus A_k$. Next, the k-th row of A may be multiplied 1314 by the second encoded matrix: $R_k = \text{SumRows}(A_k \odot <B>)$. A scaled mask for the k-th row may be determined 1316 as $E \in R^{m \times n} = \{e_{i,j}\}$, where $e_{i,j}=c$ if $i \equiv k$ mod m and 0 otherwise. Next, the k-th row may be isolated 1318 by computing $S_k = \{S_{k,j}\}_{0 \leq j < \lceil h/n \rceil}$, where $S_{k,j} = R_{k,j} \odot <E>^{[m \times n]}$.

In at least one embodiment, the system may determine whether 1320 to continue iterating. Steps 1306-1318 may be repeated for $k=0 \ldots f-1$ with k being incremented after each iteration. Upon completion, the system may sum 1322 m rows to fill the rows of one unit by computing $T = \{T_i\}_{0 \leq i < \lceil f/m \rceil}$, where $$T_i = \sum\nolimits_{k=i \cdot m}^{min(f-1, i \cdot m + m - 1)} S_k.$$

The end result T may be returned as the final output of process 1300. The output may be $<c \cdot AB>$ encoded relative to an m×n encoding unit.

The process 1300 illustrated in FIG. 13 can be modified to support matrix-matrix multiplication on inputs and outputs that have mixed encoding units. For example, in the case where $A \in R^{m \times n}$ and $B \in R^{n \times m}$ with m<n, the matrix-matrix product $<c \cdot AB>$ relative to an m×n encoding unit can be computed from inputs $<A^T>$ and $<B>$ encoded relative to an n×m encoding unit—in other words, the output matrix is encoded relative to an encoding unit that is different from the encoding unit of the input matrices. One way in which this can be accomplished is by modifying the mask from step 1316 so that rather than masking out m consecutive rows, those rows are instead distributed evenly across the n rows of the encoding unit:

$E \in R^{m \times n} = \{e_{i,j}\}$, where $e_{i,j}=c$ if $i=k, j<m$ and 0 otherwise By making this modification, rather than getting a result encoded as $$\begin{bmatrix} c \cdot AB \\ 0 \end{bmatrix}$$

with respect to an n×m encoding unit as would be the case with process 1300 illustrated in FIG. 13, the result would be [c·AB|0] encoded relative to an m×n encoding unit. Accordingly, by making the modification above, encoded (and encrypted) matrices $<A>^{[n \times m]}$ and $<B>^{[n \times m]}$ can be used to compute a matrix-matrix multiplication product $<AB>^{[m \times n]}$ that is encoded relative to a different encoding unit from the inputs. In this case where mixed encoding units are utilized, the dimensions of matrix A and B may be such that $t=m \cdot n$.

FIG. 14 shows an illustrative example of a process 1400 to compute a matrix-matrix multiplication operation on encoded matrices, in accordance with at least one embodiment. These encoded matrices may be ciphertexts. While FIG. 14 illustrates a process where the inputs are encoded relative to the same encoding units, the process 1400 can be modified to support matrix-matrix multiplication operations with mixed encoding units, which will be explained in greater detail below. In at least one embodiment, some or all of the process 1400 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1400 may be implemented on various systems described throughout this disclosure, such as those discussed in connection with FIGS. 1-13 and 15-17. Process 1400 may correspond to Algorithm 4 described above.

In at least one embodiment, a system performing process 1400 may obtain 1402 encoding of first and second matrices relative to the same encoding unit. These may be $\langle A \rangle^{[m \times n]}$, $\langle B^T \rangle^{[m \times n]}$, for $A \in R^{f \times g}$, $B \in R^{g \times h}$, respectively. Next, an iterator k may be initialized 1404 to 0 and then iterated over for each row of $\langle B^T \rangle$. As part of a loop, process 1400 may involve determining 1406 a mask for the k-th row of $\langle B^T \rangle$. The mask may be defined as $D \in R^{m \times n} = \{d_{i,j}\}$, where $d_{i,j}=1$ if i≡k mod m and 0 otherwise. Next, the k-th row of $\langle B^T \rangle$ may be extracted 1408 as $B_k = \{B_{k,j}\}_{0 \leq j < \lceil g/n \rceil}$, where $B_{k,j} = \langle D \rangle^{[m \times n]} \odot \langle B^T \rangle_{\lfloor k/m \rfloor,j}$. This row maybe replicated 1410 to encode the k-th column of B by performing $B_k$=SumRows $(B_k)$. Next, the Hadamard product of A and k-th column of B may be computed 1412 as $R_k = \langle A \rangle \odot B_k$.

All columns of the Hadamard product $R_k$ may be summed 1414 together by computing $R_k = Lrot_{2^j}(R_k) \oplus R_k$ by looping through all values of j from 0 ... $\log_2(n)-1$. A scaled mask $E \in R^{m \times n} = \{e_{i,j}\}$, where $e_{i,j}=c$ if i≡0 mod n and 0 otherwise may be determined 1416 for the first column and then isolated and shifted 1418 to the first column by $S_k = \{S_{k,j}\}_{0 \leq j < \lceil h/n \rceil}$, where $S_{k,j} = Rrot_{k \bmod n}(R_{k,j} \odot \langle E \rangle^{[m \times n]})$. Steps 1406-1418 may be repeated for k=0 ... h−1. If k is still within this range, then the process will continue 1420 to iterate by incrementing k and finally summing 1422 n columns to fill columns of one unit to return $T=\{T_i\}_{0 \leq i < \lceil h/n \rceil}$, where $$T_i = \sum_{k=i \cdot n}^{\min(h-1, i \cdot n + n - 1)} S_k.$$

Figure 15:
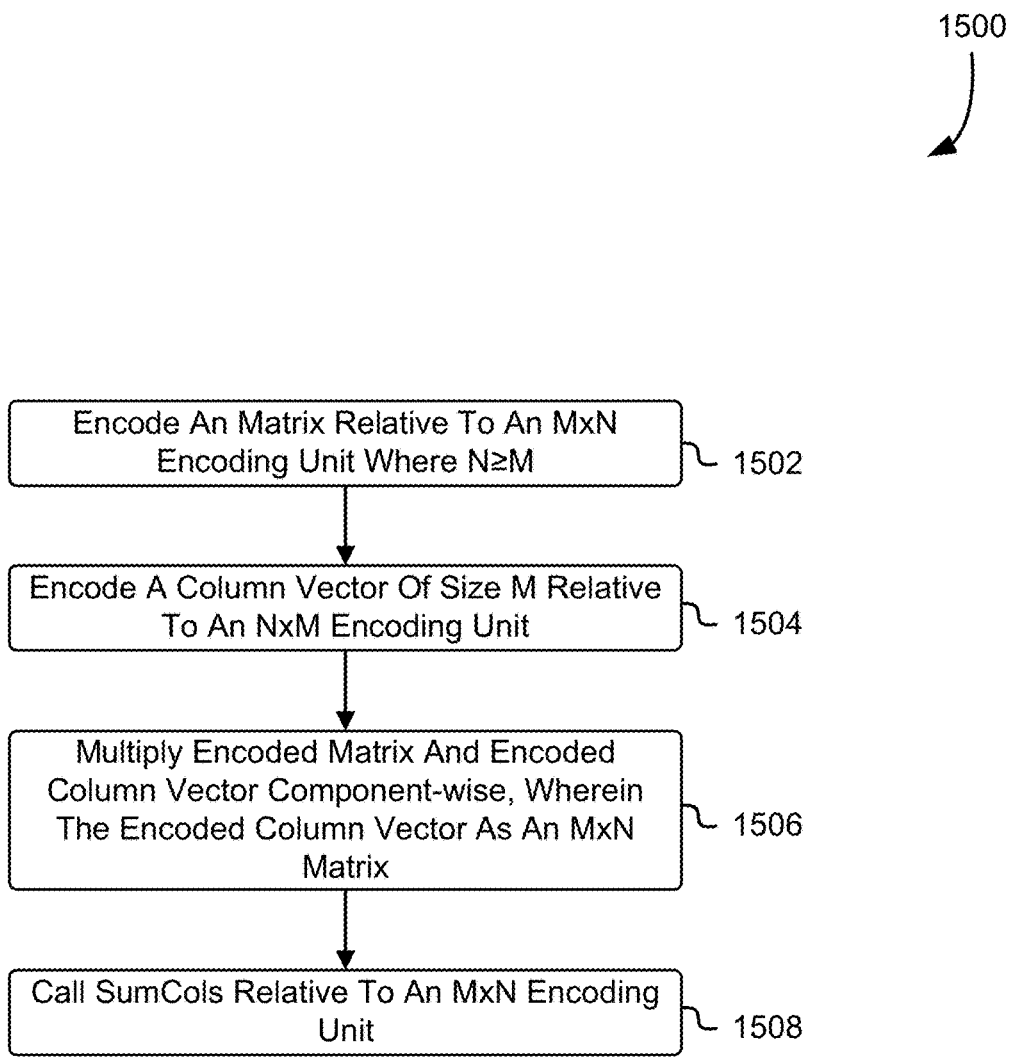
FIG. 15 shows an illustrative example of a process to perform a matrix-vector multiplication with mixed encoding units, in accordance with at least one embodiment.

FIG. 15 shows an illustrative example of a process 1500 to perform matrix-vector multiplication with mixed encoding units, in accordance with at least one embodiment. In at least one embodiment, some or all of the process 1500 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1500 may be implemented on various systems described throughout this disclosure, such as those discussed in connection with FIGS. 1-14, 16 and 17.

FIG. 15 illustrates a process 1500 for multiplying a matrix by a column vector with mixed encoding units. For example, the process 1500 may be used to compute $\langle \vec{v}^T \cdot A \rangle$ relative to an m×n encoding unit given an input matrix A that is also encoded relative to the same m×n encoding unit and, a column vector $\vec{v}$ encoded relative to an n×m encoding unit—in other words, computing $\langle \vec{v}^T \cdot A^T \rangle^{[m \times n]}$ given $\langle A \rangle^{[m \times n]}$ and $\langle \vec{v} \rangle^{[n \times m]}$. An additional requirement on the encoding unit may be m≤n and m·n=t. Matrix A may be encoded 1502 relative to an m×n encoding unit to produce the encoding $\langle A \rangle^{[m \times n]}$ which can be performed at any suitable time by any suitable computing entity. Column vector $\vec{v}$ may be encoded 1504 relative to an n×m encoding unit to produce the encoding $\langle \vec{v} \rangle^{[n \times m]}$. Assuming $A \in R^{f \times g}$ and $\vec{v} \in R^g$ it can be observed that $\langle A \rangle^{[m \times n]}$ looks like [A|0] when m<n. Additionally, the column vector $\vec{v}$ can be encoded with respect to a single n×m encoding unit by creating an n×m matrix where each row is $\vec{v}^T$. If $\langle \vec{v} \rangle^{[n \times m]}$ is viewed as an m×n matrix, then the encoded matrix and encoded column vector can be multiplied 1506 together, with the encoded column vector being viewed as an m×n matrix. Thus, the homomorphic product corresponds to $$\langle A \rangle^{[m \times n]} \odot \text{LogTrans}(\langle \vec{v} \rangle^{[n \times m]}) = \begin{bmatrix} -\vec{a}_0^T \circ \vec{v}^T - & 0 & \cdots & 0 \\ -\vec{a}_1^T \circ \vec{v}^T - & 0 & \cdots & 0 \\ \vdots & \vdots & \vdots & \vdots \\ -\vec{a}_{m-1}^T \circ \vec{v}^T - & 0 & \cdots & 0 \end{bmatrix}$$

where $\vec{a}_i^T$ is the i-th row of matrix A. Now, calling 1508 SumCols relative to an m×n encoding unit will compute $\langle \vec{v}^T \cdot A^T \rangle^{[m \times n]}$ as the output.

Figure 16:
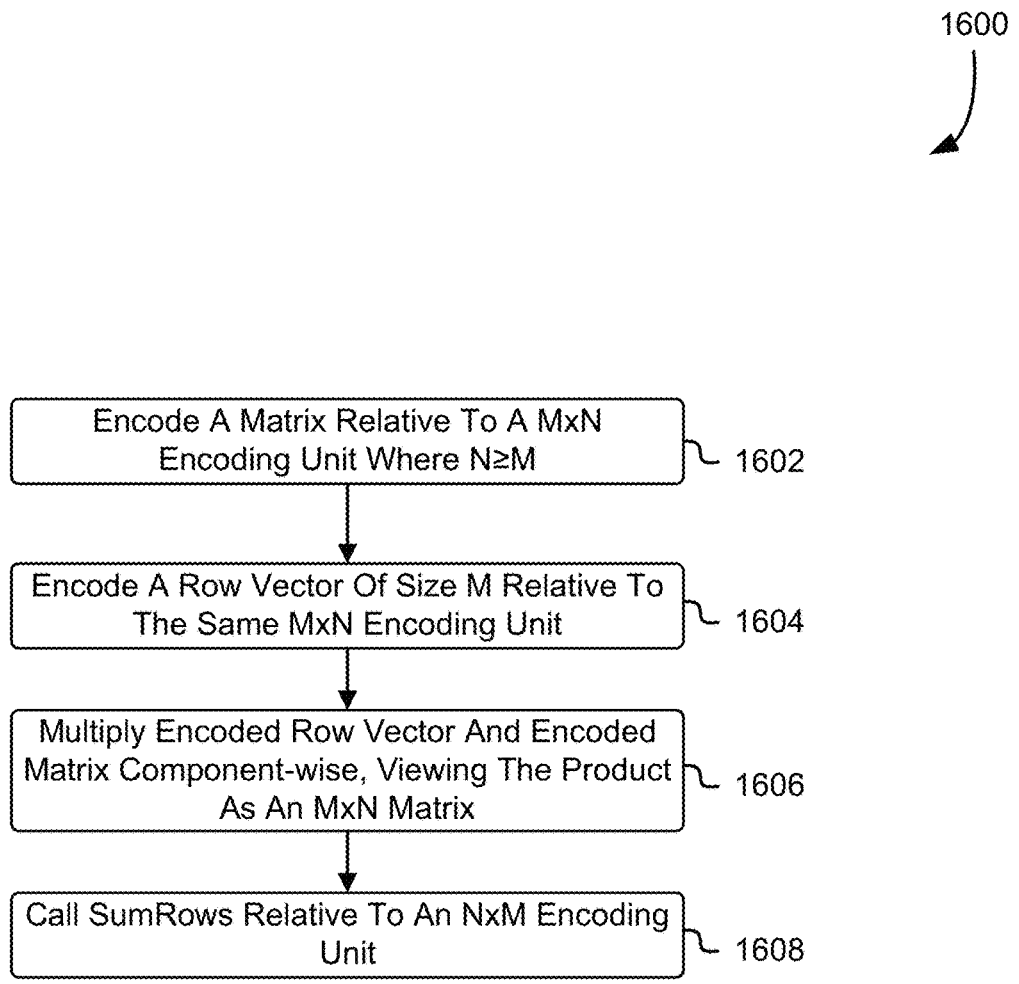
FIG. 16 shows an illustrative example of a process to perform a matrix-vector multiplication with mixed encoding units, in accordance with at least one embodiment.
Figure 17:
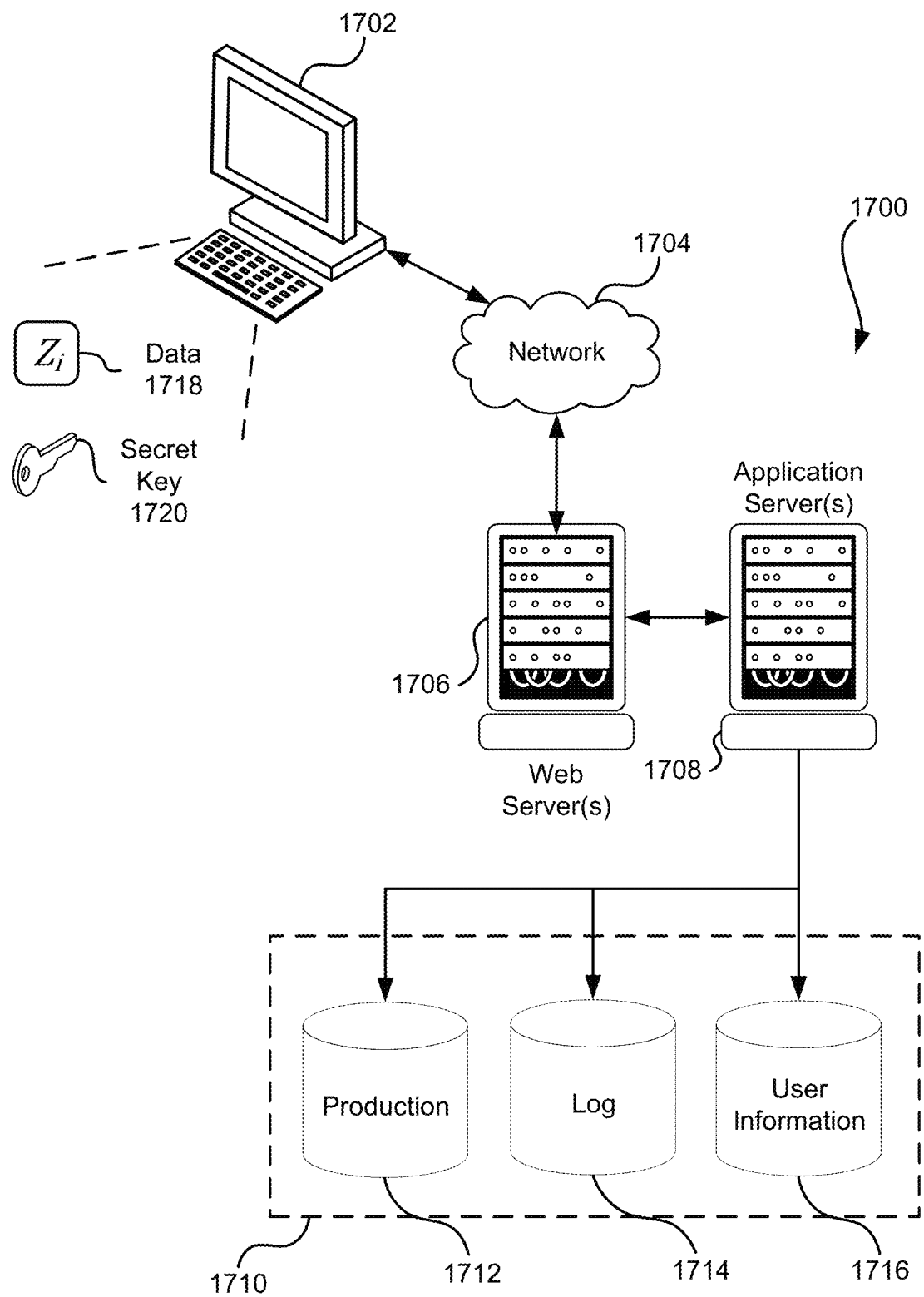
FIG. 17 illustrates a system in which various embodiments can be implemented.

FIG. 16 shows an illustrative example of a process 1600 to perform matrix-vector multiplication with mixed encoding units, in accordance with at least one embodiment. In at least one embodiment, some or all of the process 1600 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 1600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 1600 may be implemented on various systems described throughout this disclosure, such as those discussed in connection with FIGS. 1-15 and 17.

FIG. 16 illustrates a process 1600 for multiplying a row vector by a matrix with mixed encoding units. For example, the process 1600 may be used to compute $\langle A^T \cdot \vec{v} \rangle^{[n \times m]}$ using a row vector $\langle \vec{v}^T \rangle^{[m \times n]}$ and matrix $\langle A \rangle^{[m \times n]}$. Process 1600 may require a square matrix $A \in R^{f \times g}$ and a row vector $\vec{v}^T \in R^g$ and also that n>m. Matrix $A \in R^{f \times g}$ may be encoded 1602 relative to an m×n encoding unit to obtain $\langle A \rangle^{[m \times n]}$. Likewise, row vector $\vec{v}^T \in R^m$ may be encoded 1604 relative to the m×n encoding unit to obtain $<\vec{v}^T>^{[m\times n]}$. Now, $<\vec{v}^T>^{[m\times n]}$ and $<A>^{[m\times n]}$ can be multiplied 1606 to compute the homomorphic product $<\vec{v}^T>^{[m\times n]} \odot <A>^{[m\times n]}$:

$$\begin{bmatrix} -v_0 \cdot \vec{a}_0^T - & 0 & \cdots & 0 \\ -v_1 \cdot \vec{a}_1^T - & 0 & \cdots & 0 \\ \vdots & \vdots & \vdots & \vdots \\ -v_{m-1} \cdot \vec{a}_{m-1}^T - & 0 & \cdots & 0 \end{bmatrix}$$

This product can be viewed as an n×m matrix:

$$\begin{bmatrix} -v_0 \cdot \vec{a}_0^T - \\ 0 \\ -v_1 \cdot \vec{a}_0^T - \\ 0 \\ \vdots \\ -v_{m-1} \cdot \vec{a}_{m-1}^T - \\ 0 \end{bmatrix}$$

where each zero is a matrix with dimensions of $$\left(\frac{n}{m} - 1\right) \times m.$$

Note that these dimension are sized so that n≥m and n·m=$2^k$. Then, SumRows is called 1608 relative to a n×m encoding unit to obtain $<\vec{v}^T \cdot A>^{[n\times m]}$.

FIG. 17 illustrates aspects of an example system 1700 for implementing aspects in accordance with an embodiment. As will be appreciated, although a web-based system is used for purposes of explanation, different systems may be used, as appropriate, to implement various embodiments. In an embodiment, the system includes an electronic client device 1702, which includes any appropriate device operable to send and/or receive requests, messages, or information over an appropriate network 1704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1706 for receiving requests and serving content in response thereto, although for other networks an alternative device serving a similar purpose could be used as would be apparent to one of ordinary skill in the art.

In an embodiment, the illustrative system includes at least one application server 1708 and a data store 1710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1702 and the application server 1708, in an embodiment, is handled by the web server using PUP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1712 and user information 1716, which are used to serve content for the production side. The data store also is shown to include a mechanism for storing log data 1714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1710.

The data store 1710, in an embodiment, is operable, through logic associated therewith, to receive instructions from the application server 1708 and obtain, update or otherwise process data in response thereto, and the application server 1708 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 17. Thus, the depiction of the system 1700 in FIG. 17 should be taken as being illustrative in nature and not limiting to the scope of the disclosure.

In at least some embodiments, client device 1702 (e.g., a client in accordance with FIG. 14) provides ciphertexts to one or more web servers 1706 in connection with a request to perform a series of computations. For example, client device 1702 may be operated a first organization with sensitive data (e.g., data 1718) that it does not want to expose in plaintext to a second organization that operates one or more web servers 1706. Sensitive data (e.g. data 1718) may be encrypted using a secret key 1720 (e.g., symmetric key or asymmetric private key) to produce a ciphertext. An example of sensitive data may be mini-batch training data $Z_i$ for a logistic regression training which is accessible by the client device 1702 in plaintext and should not be exposed to the web servers 1706 in plaintext. The ciphertext may be an encrypted version of sensitive data that should not be shared between the client and the web server. The ciphertext may be encrypted using a cryptographic key (e.g., symmetric key or asymmetric private key) that the computing resource service provider lacks access to. One or more inputs to a program may be encrypted to generate one or more ciphertext inputs. Client device 1702 may transmit the one or more ciphertext inputs to web server 1706 in connection with a request to execute a program (e.g., run logistic regression training on the one or more ciphertexts). A client may refer to a client computer system or a customer controlling a client computer system, based on context.

Web server 1706 may receive a request from client device 1702 via network 1704 and route the request to one or more application servers 1708 that perform a series of homomorphic operations on one or more ciphertexts that it receives from the client using an optimized homomorphic circuit to generate one or more ciphertext outputs. The ciphertext outputs may be routed from the application server 1708 to client device 1702 in any suitable manner (e.g., by web server 1706 via network 1704). In accordance with a homomorphic encryption scheme, the client decrypts each of the received ciphertext outputs using the secret key 1720 to obtain one or more plaintext results. In some cases, a pair of asymmetric keys are utilized for encryption and decryption. In at least one embodiment, results refers the results that would have been generated had the program (e.g., logistic regression training) been computed using the plaintext rather than the ciphertext. As a result, client device 1702 is able to utilize the computing resources of application server 1708 to perform a set of computations (e.g., logistic regression training) using ciphertexts of sensitive data that protects the confidentiality of the sensitive data as well as the confidentiality of the results. In at least one embodiment, techniques described in connection with FIG. 14 are implemented in the context of FIG. 17.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol.

Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PUP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In various embodiments described throughout this disclosure, computing resources are configured to perform tasks (e.g., generate data, process data, store data, route messages, transmit data, submit requests, process requests) by loading computer-readable executable instructions into memory that, as a result of execution by one or more processors, cause the one or more processors to execute instructions to perform tasks. In at least one embodiment, a computer system is configured to perform a task through a software application that controls the execution of specific commands, requests, tasks, jobs, and more. A computer system may be configured to execute computer-readable instructions encoded in a software application by loading executable code of the software application into memory and using one or more processors of the computer system to run the executable instructions.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
one or more processors; and
memory that stores computer-executable instructions to that, as a result of execution, cause the one or more processors to:
encode an encoded input matrix relative to a first m×n encoding unit, wherein m≤n and m·n corresponds to a number of plaintext slots according to a homomorphic encryption scheme;
encode an encoded input vector relative to the first encoding unit or a second n×m encoding unit that is a transpose of the first encoding unit; and
execute a homomorphic circuit that includes a reduced depth matrix-vector multiplication operation with the encoded input matrix and the encoded input vector,
wherein an encoded output of the matrix-vector multiplication operation is encoded relative to the second n×m encoding unit.

2. The system of claim 1, wherein:
the encoded input vector is a column vector encoded relative to the second n×m encoding unit; and
the instructions to execute the homomorphic circuit include instructions that, as a result of execution, cause the one or more processors to:
compute a homomorphic product based on the encoded input matrix and the encoded input vector; and
sum each column of the homomorphic product to produce the encoded output relative to the first m×n encoding unit.

3. The system of claim 2, wherein the instructions to compute the homomorphic product of the encoded input matrix and the encoded input vector, as a result of execution, cause the one or more processors to:
perform a logical transpose on the encoded input vector to determine an object encoded relative to the first m×n encoding unit, wherein each row of the object includes at least one copy of the column vector transposed; and
perform a component-wise multiplication between the encoded input matrix and a view of the encoding of the column vector to compute the homomorphic product.

4. The system of claim 2, wherein the column vector is encoded relative to the second n×m encoding unit as a plurality of n rows, wherein each row includes a copy of the column vector transposed.

5. The system of claim 1, wherein:
the encoded input vector is a row vector encoded relative to the first m×n encoding unit; and
the instructions to execute the homomorphic circuit include instructions that, as a result of execution, cause the one or more processors to:
compute a homomorphic product of the encoded input vector and the encoded input matrix, relative to the first m×n encoding unit;
perform a logical transpose on the homomorphic product encoded relative to the first m×n encoding unit to determine an object encoded relative to the second n×m encoding unit; and
sum each row of the object relative to the second n×m encoding unit, thereby determining an encoding of the encoded output relative to the second n×m encoding unit.

6. The system of claim 5, wherein the row vector is encoded relative to the first m×n encoding unit as a plurality of n columns, wherein each column is a copy of the row vector transposed.

7. The system of claim 5, wherein the instruction to perform the logical transpose are to view the homomorphic product encoded relative to the first m×n encoding unit as a flat list in row-major order and then reinterpret the flat list relative to the second n×m encoding unit.

8. A computer-implemented method, comprising:
encoding an encoded input matrix relative to a first m×n encoding unit, wherein m≤n and m·n corresponds to a number of plaintext slots according to a homomorphic encryption scheme;
encoding an encoded input vector relative to the first encoding unit or a second n×m encoding unit that is a transpose of the first encoding unit; and
executing a homomorphic circuit that includes a reduced depth matrix-vector multiplication operation with the encoded input matrix and the encoded input vector,
wherein an encoded output of the matrix-vector multiplication operation is encoded relative to the second n×m encoding unit.

9. The computer-implemented method of claim 8, wherein:
the encoded input vector is a column vector encoded relative to the second n×m encoding unit; and
executing the homomorphic circuit comprises:
computing a homomorphic product based on the encoded input matrix and the encoded input vector; and
summing each column of the homomorphic product to produce the encoded output relative to the first m×n encoding unit.

10. The computer-implemented method of claim 9, wherein computing the homomorphic product of the encoded input matrix and the encoded input vector comprises:
performing a logical transpose on the encoded input vector to determine an object encoded relative to the first m×n encoding unit, wherein each row of the object includes at least one copy of the column vector transposed; and
performing a component-wise multiplication between the encoded input matrix and a view of the encoding of the column vector to compute the homomorphic product.

11. The computer-implemented method of claim 9, wherein the column vector is encoded relative to the second n×m encoding unit as a plurality of n rows, wherein each row includes a copy of the column vector transposed.

12. The computer-implemented method of claim 8, wherein:
the encoded input vector is a row vector encoded relative to the first m×n encoding unit; and
executing the homomorphic circuit comprises:
computing a homomorphic product of the encoded input vector and the encoded input matrix, relative to the first m×n encoding unit;
performing a logical transpose on the homomorphic product encoded relative to the first m×n encoding unit to determine an object encoded relative to the second n×m encoding unit; and summing each row of the object relative to the second n×m encoding unit, thereby determining an encoding of the encoded output relative to the second n×m encoding unit.

13. The computer-implemented method of claim 12, wherein the row vector is encoded relative to the first m×n encoding unit as a plurality of n columns and wherein each column is a copy of the row vector transposed.

14. The computer-implemented method of claim 12, wherein performing the logical transpose views the homomorphic product encoded relative to the first m×n encoding unit as a flat list in row-major order and reinterprets the flat list relative to the second n×m encoding unit.

15. A non-transitory computer-readable storage medium storing executable instructions that, as a result of being executed by one or more processors of a computer system, cause the computer system to at least:
- encode an encoded input matrix relative to a first m×n encoding unit, wherein m≤n and m·n corresponds to a number of plaintext slots according to a homomorphic encryption scheme;
- encode an encoded input vector relative to the first encoding unit or a second n×m encoding unit that is a transpose of the first encoding unit; and
- execute a homomorphic circuit that includes a reduced depth matrix-vector multiplication operation with the encoded input matrix and the encoded input vector,
- wherein an encoded output of the matrix-vector multiplication operation is encoded relative to the second n×m encoding unit.

16. The non-transitory computer readable medium of claim 15, wherein:
- the encoded input vector is a column vector encoded relative to the second n×m encoding unit; and
- the instructions to execute the homomorphic circuit include instructions that, as a result of execution, cause the one or more processors to:
  - compute a homomorphic product based on the encoded input matrix and the encoded input vector; and
  - sum each column of the homomorphic product to produce the encoded output relative to the first m×n encoding unit.

17. The non-transitory computer readable medium of claim 16, wherein the instructions to compute the homomorphic product of the encoded input matrix and the encoded input vector, as a result of execution, cause the one or more processors to:
- perform a logical transpose on the encoded input vector to determine an object encoded relative to the first m×n encoding unit, wherein each row of the object includes at least one copy of the column vector transposed; and
- perform a component-wise multiplication between the encoded input matrix and a view of the encoding of the column vector to compute the homomorphic product.

18. The non-transitory computer readable medium of claim 16, wherein the column vector is encoded relative to the second n×m encoding unit as a plurality of n rows, wherein each row includes a copy of the column vector transposed.

19. The non-transitory computer readable medium of claim 15, wherein:
- the encoded input vector is a row vector encoded relative to the first m×n encoding unit; and
- the instructions to execute the homomorphic circuit include instructions that, as a result of execution, cause the one or more processors to:
  - compute a homomorphic product of the encoded input vector and the encoded input matrix, relative to the first m×n encoding unit;
  - perform a logical transpose on the homomorphic product encoded relative to the first m×n encoding unit to determine an object encoded relative to the second n×m encoding unit; and
  - sum each row of the object relative to the second n×m encoding unit, thereby determining an encoding of the encoded output relative to the second n×m encoding unit.

20. The non-transitory computer readable medium of claim 19, wherein the row vector is encoded relative to the first m×n encoding unit as a plurality of n columns, wherein each column is a copy of the row vector transposed.

* * * * *